US007885522B2

(12) United States Patent
Gassman et al.

(10) Patent No.: US 7,885,522 B2
(45) Date of Patent: Feb. 8, 2011

(54) PHOTO BOOTH SYSTEMS AND METHODS

(75) Inventors: Matthew J. Gassman, Minneapolis, MN (US); Jacob G. Stewart, Minneapolis, MN (US)

(73) Assignee: The Traveling Photo Booth Inc., Minneapolis, MN (US)

( * ) Notice: Subject to any disclaimer, the term of this patent is extended or adjusted under 35 U.S.C. 154(b) by 147 days.

(21) Appl. No.: 12/172,795

(22) Filed: Jul. 14, 2008

(65) Prior Publication Data
US 2010/0008657 A1    Jan. 14, 2010

(51) Int. Cl.
*G03B 15/00*    (2006.01)
(52) U.S. Cl. .......................................... 396/2
(58) Field of Classification Search ........................ 396/2
See application file for complete search history.

(56) References Cited

U.S. PATENT DOCUMENTS

| | | | |
|---|---|---|---|
| 4,959,670 A | 9/1990 | Thayer, Jr. | |
| D324,873 S | 3/1992 | Thayer | |
| 5,446,515 A | 8/1995 | Wolfe et al. | |
| 5,623,581 A | 4/1997 | Attenberg | |
| 5,765,874 A * | 6/1998 | Chanenson et al. ........... 283/67 |
| 5,784,651 A | 7/1998 | Mauchan | |
| 5,913,019 A | 6/1999 | Attenberg | |
| 6,085,195 A | 7/2000 | Hoyt et al. | |
| 6,141,482 A | 10/2000 | Massarksy | |
| D433,695 S | 11/2000 | Smart | |
| 6,369,908 B1 | 4/2002 | Frey et al. | |
| 6,928,238 B2 | 8/2005 | Nakanishi et al. | |
| 7,212,308 B2 | 5/2007 | Morgan | |
| 2004/0120008 A1* | 6/2004 | Morgan ..................... 358/1.18 |
| 2004/0179233 A1 | 9/2004 | Vallomy | |
| 2005/0167487 A1 | 8/2005 | Conlon et al. | |
| 2006/0131388 A1 | 6/2006 | Brodin | |
| 2007/0124977 A1 | 6/2007 | Alexander | |

OTHER PUBLICATIONS

Photograph of a first-generation photo booth; in use prior to Jul. 14, 2007 (1 page); see additional description within Information Disclosure Statement.
Photographs of a second-generation photo booth; in use prior to Jul. 14, 2007 (4 pages); see additional description within Information Disclosure Statement.
Brochure (showing the second-generation photo booth), The Traveling Photo Booth (1 page); in publication Mar. 1, 2006.

* cited by examiner

*Primary Examiner*—Rodney E Fuller
(74) *Attorney, Agent, or Firm*—Mueting, Raasch & Gebhardt, P.A.

(57) ABSTRACT

Photo booth systems and methods of using photo booth systems, such as those that provide photo booths and interaction between the photo booths and one or more user groups.

23 Claims, 43 Drawing Sheets

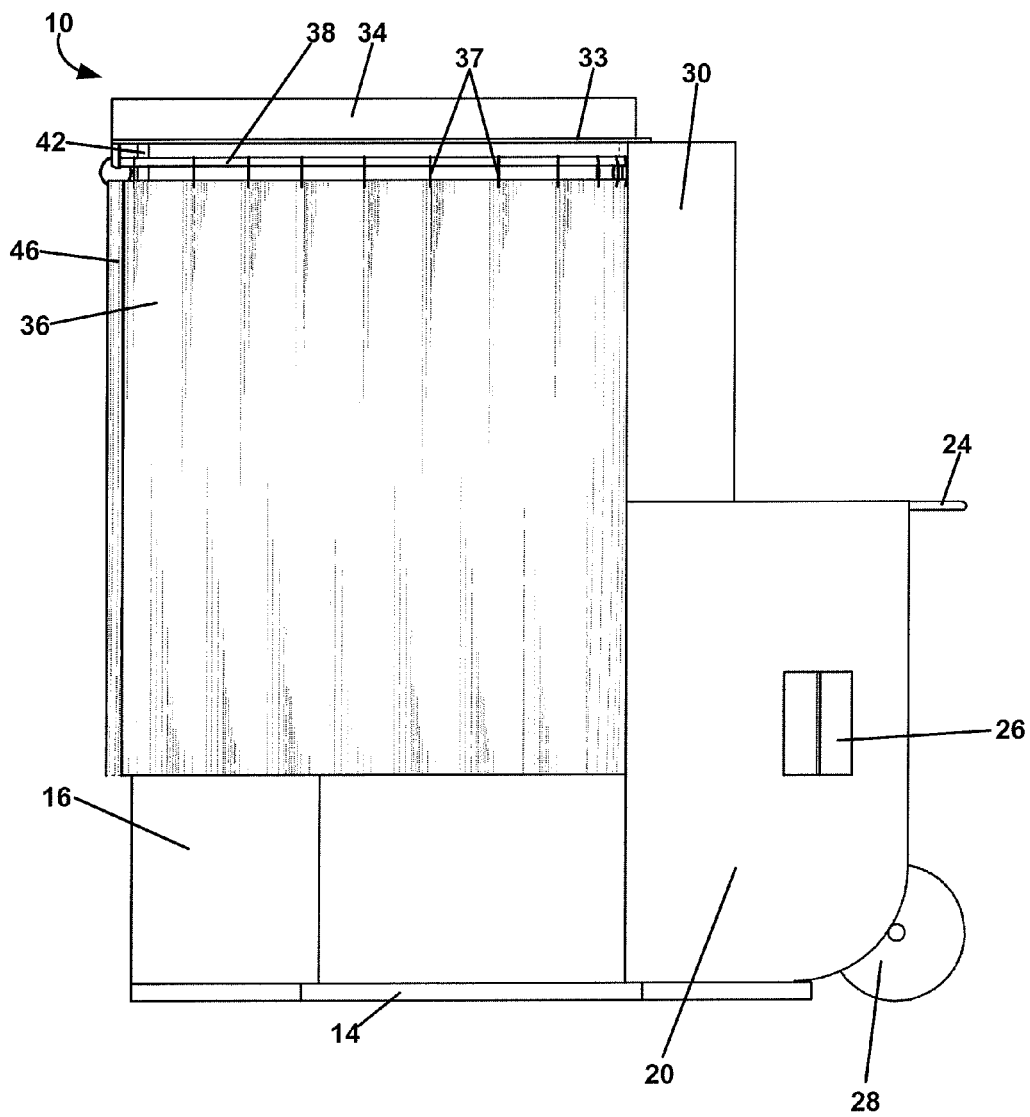

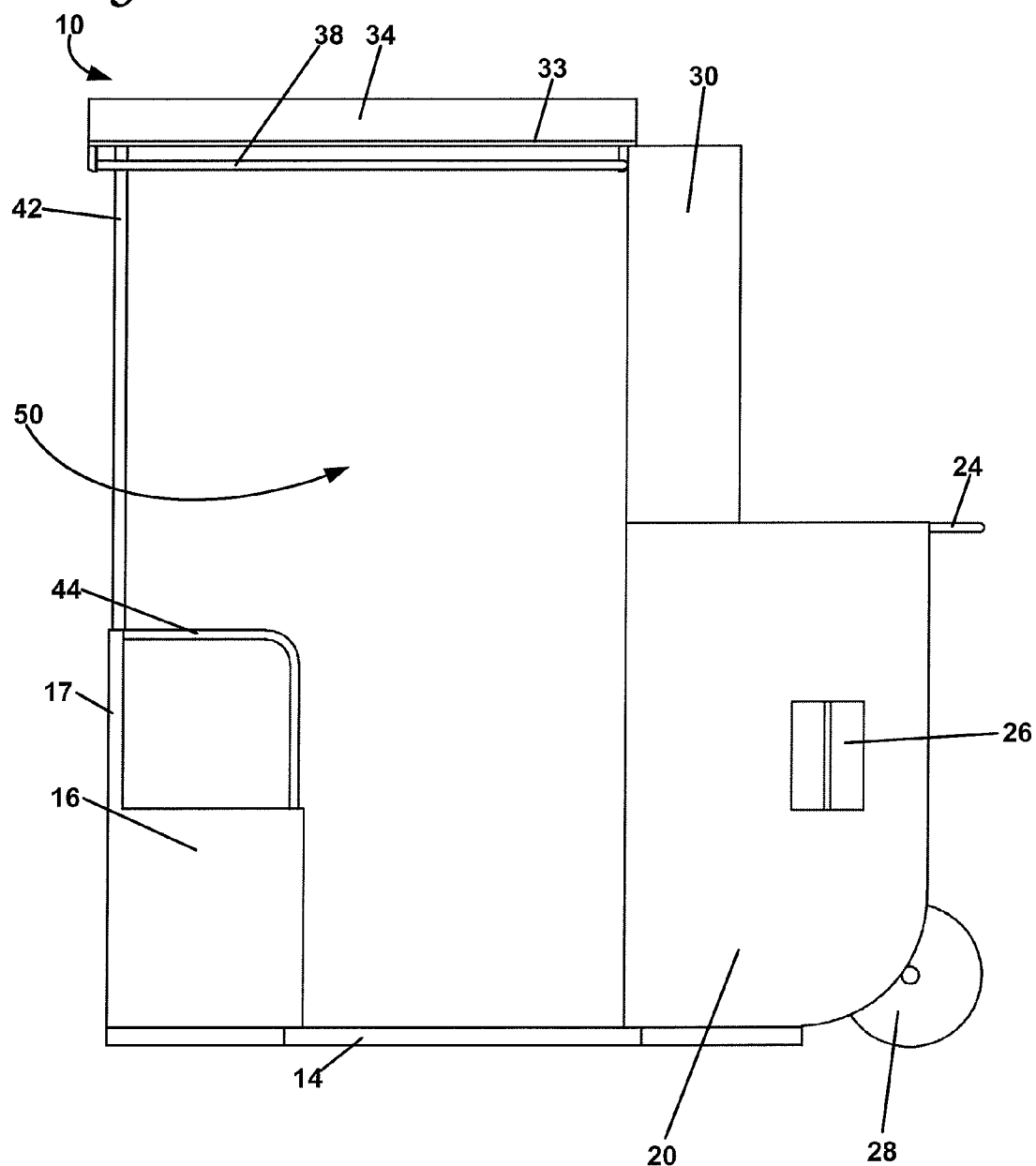

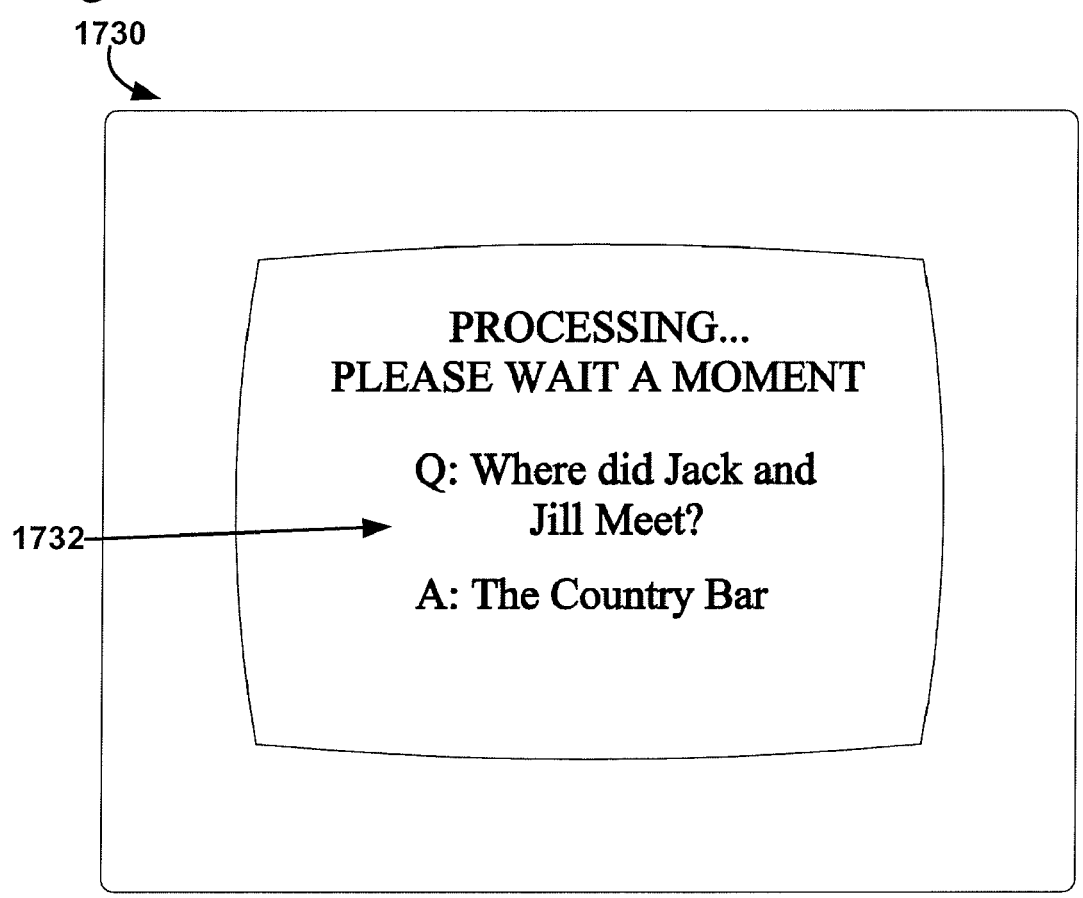

FIG. 18B
1850
| Event Report Card |
|---|
| Q: Where did Jack and Jill Meet? 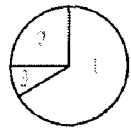<br>1. The Country Bar: 64%<br>2. Blind Date: 25% Correct Answer<br>3. Amy's Wedding: 11% |
| Q: Who is more likely to overdraw their checking Account? <br>1. Jack: 87%<br>2. Jill 13% |

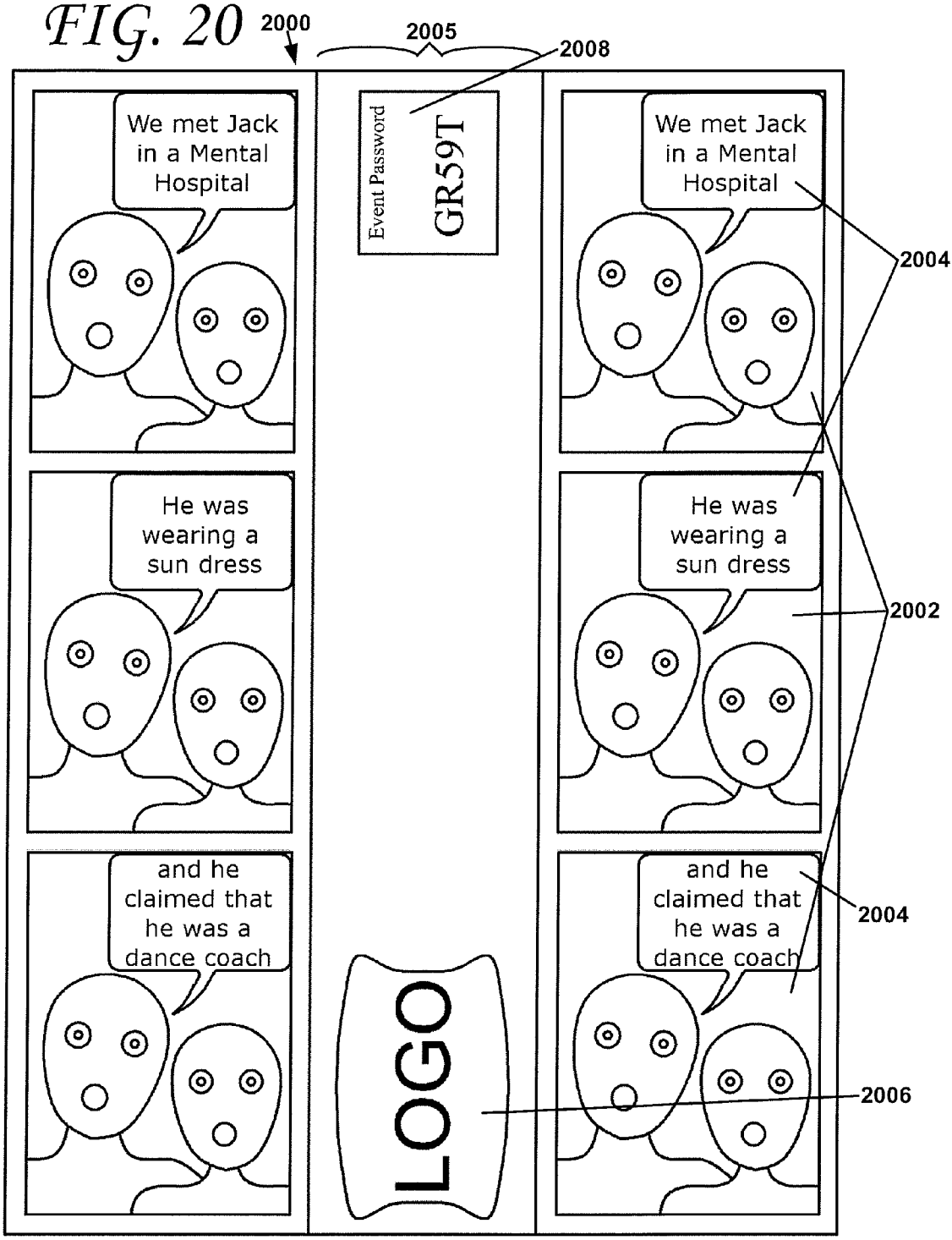

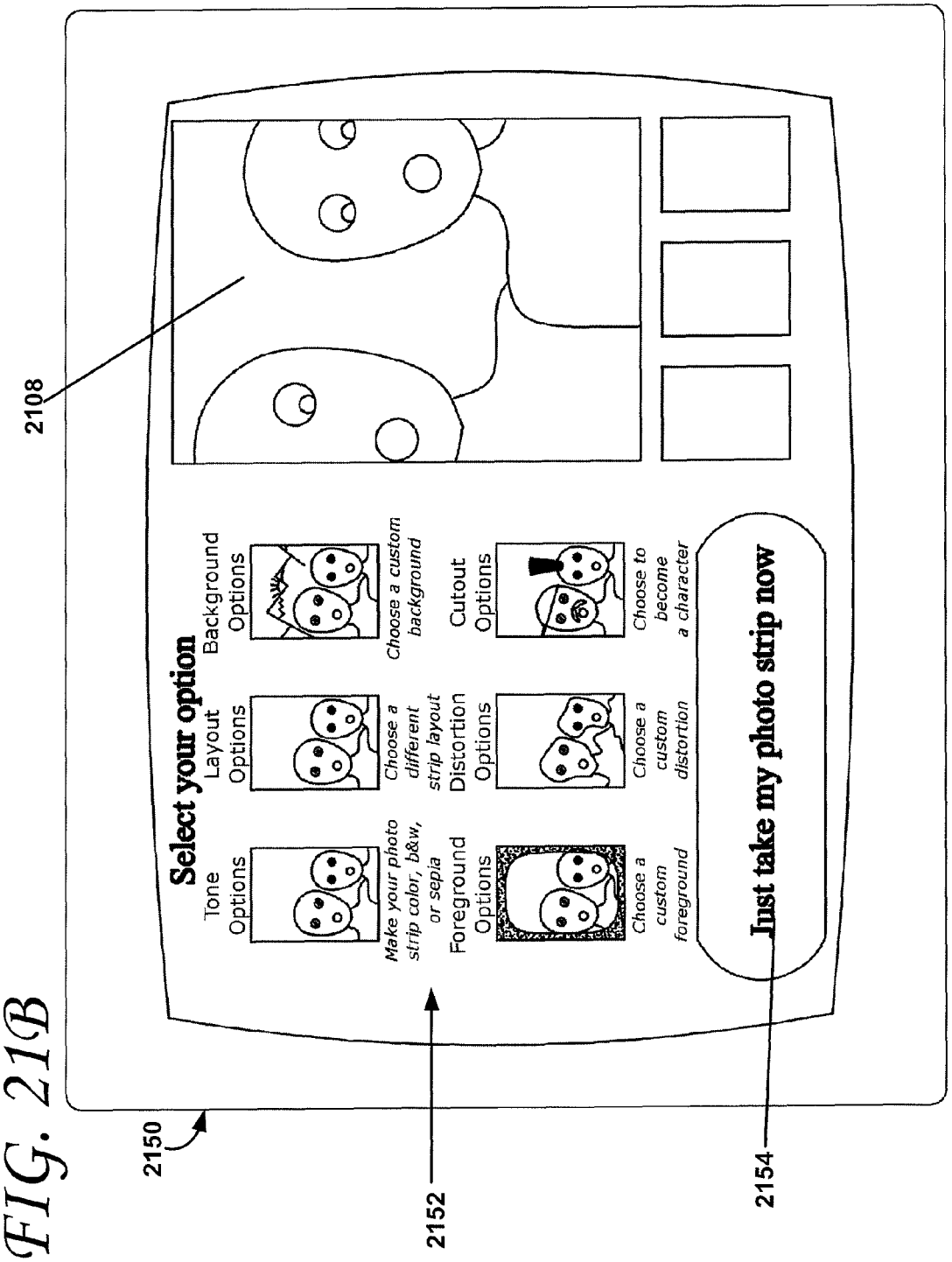

PHOTO BOOTH SYSTEMS AND METHODS

BACKGROUND

The present invention relates generally to photo booth systems and methods. More particularly, the present invention pertains to systems that include photo booths and to methods that provide photo booths and interaction between the photo booths and one or more user groups.

SUMMARY

Generally, the present invention includes photo booth systems and methods of using photo booth systems. A user may interact with the photo booth systems to, e.g., take photographs, conduct quiz games, add text and/or text in speech bubbles to photographs, manipulate photographs, and/or play raffle games.

In one embodiment of a method of using a photo booth according to the present invention, the method includes providing a photo booth, wherein the photo booth defines a user space. The photo booth includes: computing apparatus; printing apparatus operably coupled to the computing apparatus; imaging apparatus operably coupled to the computing apparatus, wherein the imaging apparatus is configured to image the user space; input apparatus operably coupled to the computing apparatus, wherein the input apparatus is configured to allow a user to input information into the computing apparatus; and output apparatus operably coupled to the computing apparatus, wherein the output apparatus is configured to present information to a user from the computing apparatus, wherein the output apparatus includes a display.

Further, the method includes interacting between the photo booth and one or more user groups, wherein each user group of the one or more user groups includes one or more users. Interacting between the photo booth and each user group of the one or more user groups includes: displaying on the display a question from one or more questions provided by the computing apparatus to the user group; displaying on the display two or more answers from a plurality of answers provided by the computing apparatus to the user group, wherein the displayed two or more answers correspond to the displayed question; allowing the user group to select one or more of the two or more displayed answers using the input apparatus; and storing the one or more selected answers with the computing apparatus.

Still further, the method includes analyzing the selected answers stored using the computing apparatus to provide results.

In another embodiment of a method of using a photo booth for one or more events, the method includes providing a photo booth, wherein the photo booth defines a user space. The photo booth includes: computing apparatus; printing apparatus operably coupled to the computing apparatus; imaging apparatus operably coupled to the computing apparatus, wherein the imaging apparatus is configured to image the user space; input apparatus operably coupled to the computing apparatus, wherein the input apparatus is configured to allow a user to input information into the computing apparatus; and output apparatus operably coupled to the computing apparatus, wherein the output apparatus is configured to present information to a user from the computing apparatus, wherein the output apparatus includes a display.

Further, the method includes interacting between the photo booth and one or more user groups, wherein each user group of the one or more user groups includes one or more users. Interacting between the photo booth and each user group of the one or more user groups includes: displaying on the display a question from one or more questions provided by the computing apparatus to the user group; allowing the user group to input an answer using the input apparatus; storing the answer with the computing apparatus; imaging the user space with the imaging apparatus to provide one or more images; storing the one or more images with the computing apparatus; and printing using the printing apparatus a photo strip. The photo strips includes at least one image of the one or more images.

Still further, the method includes printing using the printing apparatus the stored answers.

In another embodiment of a method of using a photo booth for one or more events, the method includes providing a photo booth, wherein the photo booth defines a user space. The photo booth includes: computing apparatus; printing apparatus operably coupled to the computing apparatus; imaging apparatus operably coupled to the computing apparatus, wherein the imaging apparatus is configured to image the user space; input apparatus operably coupled to the computing apparatus, wherein the input apparatus is configured to allow a user to input information into the computing apparatus; and output apparatus operably coupled to the computing apparatus, wherein the output apparatus is configured to present information to a user from the computing apparatus, wherein the output apparatus includes a display.

Further, the method includes interacting between the photo booth and one or more user groups, wherein each user group of the one or more user groups includes one or more users. Interacting between the photo booth and each user group of the one or more user groups includes: allowing the user group to input one or more alphanumeric strings using the input apparatus into the computing apparatus; generating a final alphanumeric string based on the one or more alphanumeric strings using the computing apparatus; imaging the user space with the imaging apparatus to provide two or more images; storing the two or more images with the computing apparatus; and printing using the printing apparatus a photo strip. The photo strip includes: at least two images of the two or more images; and the final alphanumeric string.

At least in one embodiment, allowing the user group to input one or more alphanumeric strings using the input apparatus into the computing apparatus may include: displaying on the display a plurality of first alphanumeric strings provided by the computing apparatus; allowing the user group to select a first alphanumeric string of the plurality of first alphanumeric strings; displaying on the display a plurality of second alphanumeric strings provided by the computing apparatus; and allowing the user group to select a second alphanumeric string of a plurality of second alphanumeric strings.

Further, generating the final alphanumeric string based on the one or more alphanumeric strings using the computing apparatus includes: providing one or more fill-in-the-blank phrases with the computing apparatus; and inserting at least the first selected alphanumeric string and the second selected alphanumeric string into a fill-in-the-blank phrase of the one or more fill-in-the-blank phrases to provide the final alphanumeric string.

In another embodiment of a method of using a photo booth for one or more events, the method may include providing a configuration medium with event specific configuration information. The event specific configuration information may include configuration information about one event of the one or more events.

Further, the method may include providing a photo booth. The photo booth may define and user space and may include:

computing apparatus, wherein the computing apparatus is configurable for one or more events; printing apparatus operably coupled to the computing apparatus; imaging apparatus operably coupled to the computing apparatus, wherein the imaging apparatus is configured to image the user space; input apparatus operably coupled to the computing apparatus, wherein the input apparatus is configured to allow a user to input information into the computing apparatus, wherein the input apparatus may include an input interface for receiving the configuration medium; and output apparatus operably coupled to the computing apparatus, wherein the output apparatus is configured to present information to a user from the computing apparatus, wherein the output apparatus may include a display.

Still further, the method may include configuring the photo booth with the configuration medium. Configuring the photo booth with the configuration medium may include: interfacing the configuration medium with the input interface of the input apparatus of the photo booth; and transferring the event specific configuration information from the configuration medium to the computing apparatus of the photo booth.

Yet still further, the method may include interacting between the photo booth and one or more user groups, wherein each user group of the one or more user groups may include one or more users. Interacting between the photo booth and each user group of the one or more user groups may include: imaging the user space with the imaging apparatus to provide one or more images; storing the one or more images with the computing apparatus; and modifying the one or more images in accordance with the event specific configuration information. In one or more embodiments, the event specific configuration information may include photo strip layout, gutter layout, tone, one or more alphanumeric strings to be displayed on the display or printed on the photo strip, duration of operation for the photo booth, an audio message to be displayed on the display, a video message to be displayed on the display, and/or information to be displayed.

In another embodiment of a method of using a photo booth, the method may include providing a photo booth and interacting between the photo booth and one or more user groups. Each user group of the one or more user groups may include one or more users. Interacting between the photo booth and each user group of the one or more user groups may include: displaying on the display a preview image of the user space to be imaged by the imaging apparatus; displaying on the display one or more imaging options, wherein the imaging options define selectable options operable to modify images imaged with the imaging apparatus using the computing apparatus; allowing the user group to select an imaging option of the one or more imaging options using the input apparatus; displaying on the display the preview image modified by the selected imaging option; imaging the user space with the imaging apparatus to provide one or more images; storing the one or more images with the computing apparatus; modifying at least one image of the one or more images with the selected imaging option using the computing apparatus; and printing using the printing apparatus a photo strip including the at least one modified image of the one or more images. In one or more embodiments, the imaging options may include at least one of background options, foreground options, tone options, layout options, distortion options, and cutout options.

In another embodiment of a method of using a photo booth, the method may include providing a photo booth and providing one or more exterior display devices operably coupled to the computing apparatus of the photo booth. The one or more exterior display devices are capable of displaying images, wherein the images displayed by the one or more exterior display devices are viewable outside of the user space of the booth.

Further, the method may include interacting between the photo booth and one or more user groups, wherein each user group of the one or more user groups may include one or more users. Interacting between the photo booth and each user group of the one or more user groups may include: imaging the user space with the imaging apparatus to provide one or more images; storing the one or more images with the computing apparatus; transmitting at least one image of the one or more images to at least one exterior display device of the one or more exterior display devices; and displaying the one or more images with the at least one exterior display device of the one or more exterior display devices that received the at least one image of the one or more images.

In one embodiment of a photo booth according to the present invention, the photo booth may define a user space and may include: computing apparatus, wherein the computing apparatus is configurable for one or more events; printing apparatus operably coupled to the computing apparatus, wherein the printing apparatus is configured to print photo strips including one or more images; imaging apparatus operably coupled to the computing apparatus, wherein the imaging apparatus is configured to image the user space; input apparatus operably coupled to the computing apparatus, wherein the input apparatus is configured to allow a user to input information into the computing apparatus; and output apparatus operably coupled to the computing apparatus, wherein the output apparatus is configured to present information to a user from the computing apparatus. The output apparatus may include at least one of a display, auditory output apparatus, visual output apparatus, olfactory output apparatus, and somatosensory output apparatus.

In another embodiment of a method of using a photo booth according to the present invention, the method may include providing a photo booth and interacting between the photo booth and one or more user groups, wherein each user group of the one or more user groups may include one or more users. Interacting between the photo booth and each user group of the one or more user groups may include: providing an imaging sequence and randomly departing from the imaging sequence to startle the user group. Providing an imaging sequence may include: displaying on the display user instructions (e.g., pre-imaging instructions and/or a countdown) provided by the computing apparatus; outputting signaling auditory stimulation using the auditory output apparatus, wherein the signaling auditory stimulation signals to the user group when the imaging apparatus will be imaging the user space; and imaging the user space with the imaging apparatus to provide one or more images. Randomly departing from the imagining sequence may include at least one of: outputting startling auditory stimulation using auditory output apparatus; outputting startling visual stimulation using visual output apparatus; outputting startling olfactory stimulation using olfactory output apparatus; and outputting startling somatosensory stimulation using somatosensory output apparatus; and may further include imaging the user space with the imaging apparatus to provide one or more images when the user group is startled.

In another embodiment of a method of using a photo booth according to the present invention, the method may include providing a photo booth and interacting between the photo booth and one or more user groups, wherein each user group of the one or more user groups may include one or more users. Interacting between the photo booth and one or more user groups may include: generating one or more alphanumeric strings with the computing apparatus; imaging the user space with the imaging apparatus to provide one or more images; storing the one or more images with the computing apparatus; and printing using the printing apparatus a photo strip including at least one image of the one or more images and at least one alphanumeric string of the one or more alphanumeric strings. In one or more embodiments, generating the one or more alphanumeric strings with the computing apparatus may include generating a unique alphanumeric string with the computing apparatus for each user group of the one or more user groups, wherein the at least one alphanumeric string of the photo strip may include the unique alphanumeric string, and wherein the unique alphanumeric string is operable to be used as a raffle ticket.

Further, in one or more embodiments, generating the one or more alphanumeric strings with the computing apparatus may include generating a unique alphanumeric string with the computing apparatus for each user group of the one or more user groups, wherein the at least one alphanumeric string of the photo strip may include the unique alphanumeric string, and wherein the unique alphanumeric string is operable for a user to use the unique alphanumeric string to reprint the photo strip having the unique alphanumeric string.

Still further, in one or more embodiments, generating the one or more alphanumeric strings may include generating a single alphanumeric string, wherein the single alphanumeric string is operable to be used as a password for accessing a website.

In another embodiment of a method of using a photo booth according to the present invention, the method may include providing a photo booth and interacting between the photo booth and one or more user groups, wherein each user group of the one or more user groups may include one or more users. Interacting between the photo booth and each user group of the one or more user groups may include: imaging the user space with the imaging apparatus to provide one or more images; storing the one or more images with the computing apparatus; and printing using the printing apparatus a photo strip comprising at least one image of the one or more images. The method may further include displaying on the display either a losing statement or a winning statement, wherein the winning statement is displayed less frequently than the losing statement.

The above summary of the present invention is not intended to describe each embodiment or every implementation of the present invention. Advantages, together with a more complete understanding of the invention, will become apparent and appreciated by referring to the following detailed description and claims taken in conjunction with the accompanying drawings.

BRIEF DESCRIPTION OF THE DRAWINGS

FIG. 1C is a side view of the exemplary embodiment of the photo booth according to the present invention as shown in FIG. 1A.

FIG. 1D is another side view of the exemplary embodiment of the photo booth according to the present invention as shown in FIG. 1A with the curtain removed.

FIGS. 17A-C depict exemplary screen displays of a photo booth executing another method according to the present invention, e.g., the method generally illustrated in FIG. 8.

FIG. 18B depicts an exemplary event report card generated by photo booth systems and/or methods of using photo booth systems according to the present invention, e.g., the method generally illustrated in FIG. 8.

FIG. 20 depicts another exemplary photo strip generated by photo booth systems and/or methods according to the present invention, e.g., the methods generally illustrated in FIGS. 9-10.

FIGS. 21A-B depict exemplary screen displays of a photo booth executing another method according to the present invention, e.g., the methods generally illustrated in FIG. 11.

DETAILED DESCRIPTION OF EXEMPLARY EMBODIMENTS

Figure 1A:
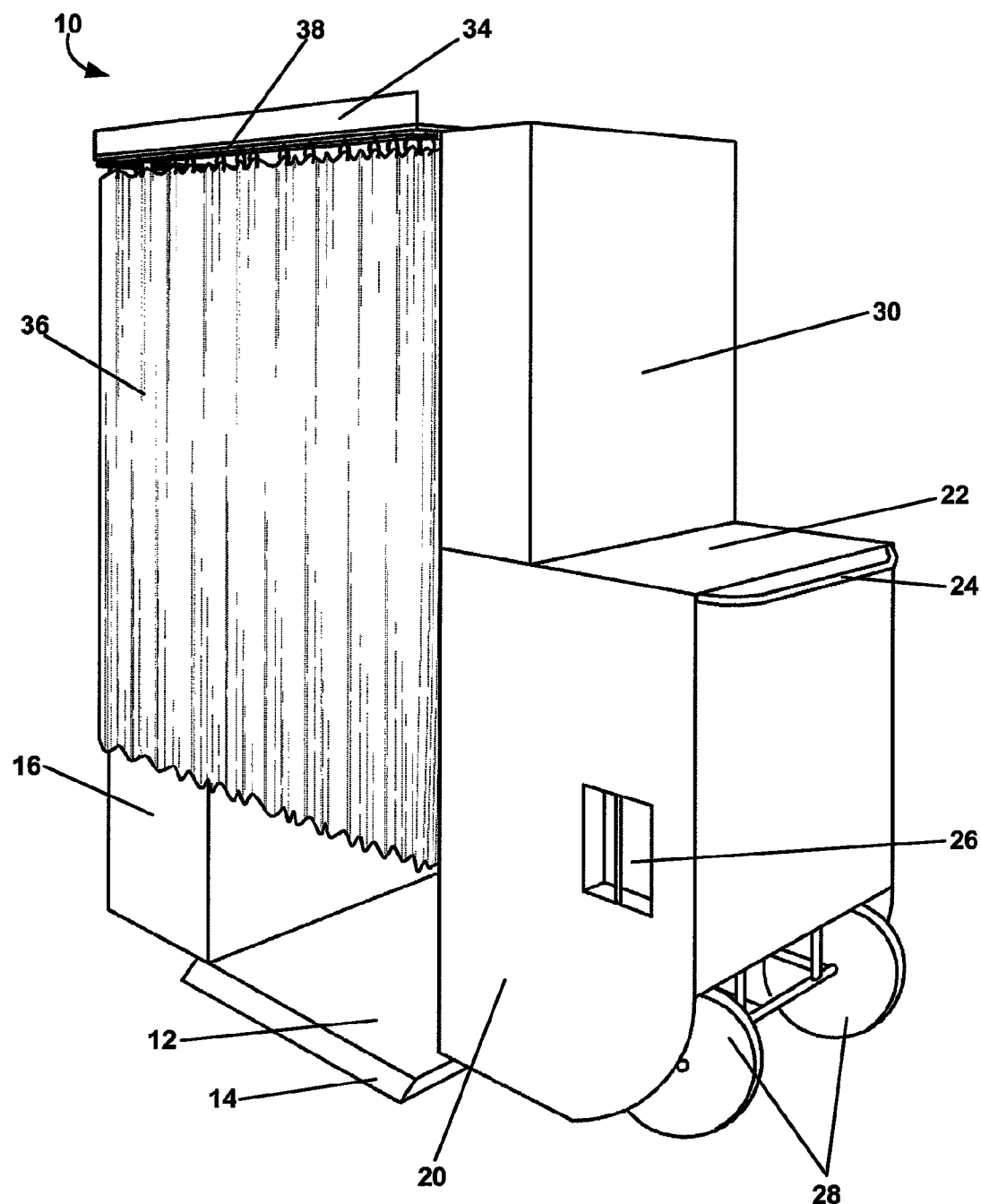
FIG. 1A is a perspective view of an exemplary embodiment of a photo booth according to the present invention.

In the following detailed description of illustrative embodiments of the invention, reference is made to the accompanying figures of the drawing which form a part hereof, and in which are shown, by way of illustration, specific embodiments in which the invention may be practiced. It is to be understood that other embodiments may be utilized and structural changes may be made without departing from the scope of the present invention. Unless stated otherwise herein, the figures of the drawing are rendered primarily for clarity and thus may not be drawn to scale.

As used herein, "a," "an," "the," "at least one," and "one or more" are used interchangeably. The term "and/or" (if used) means one or all of the listed elements or a combination of any two or more of the listed elements.

Figure 1B:
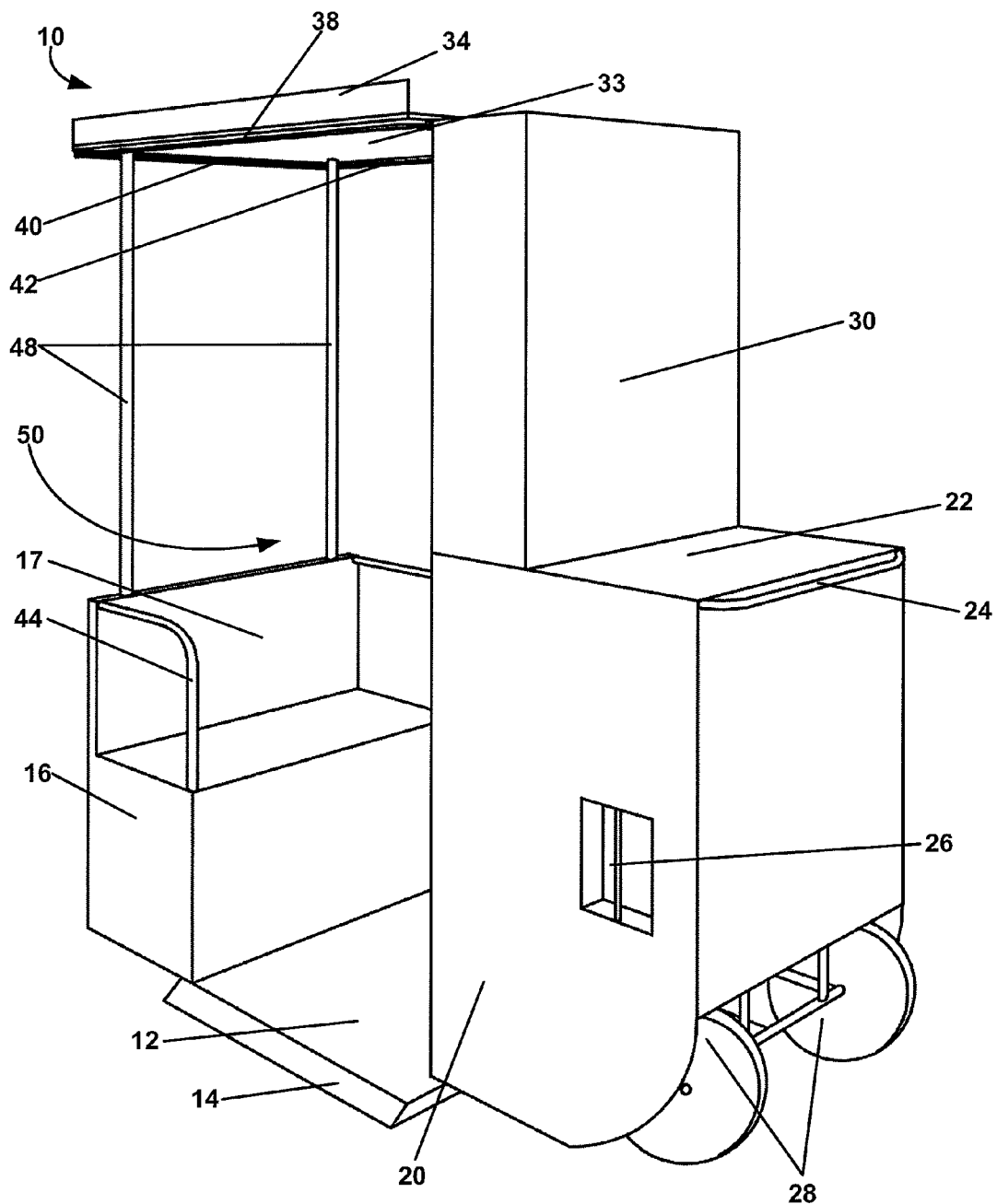
FIG. 1B is another perspective view of the exemplary embodiment of the photo booth according to the present invention as shown in FIG. 1A with the curtain removed.
Figure 1E:
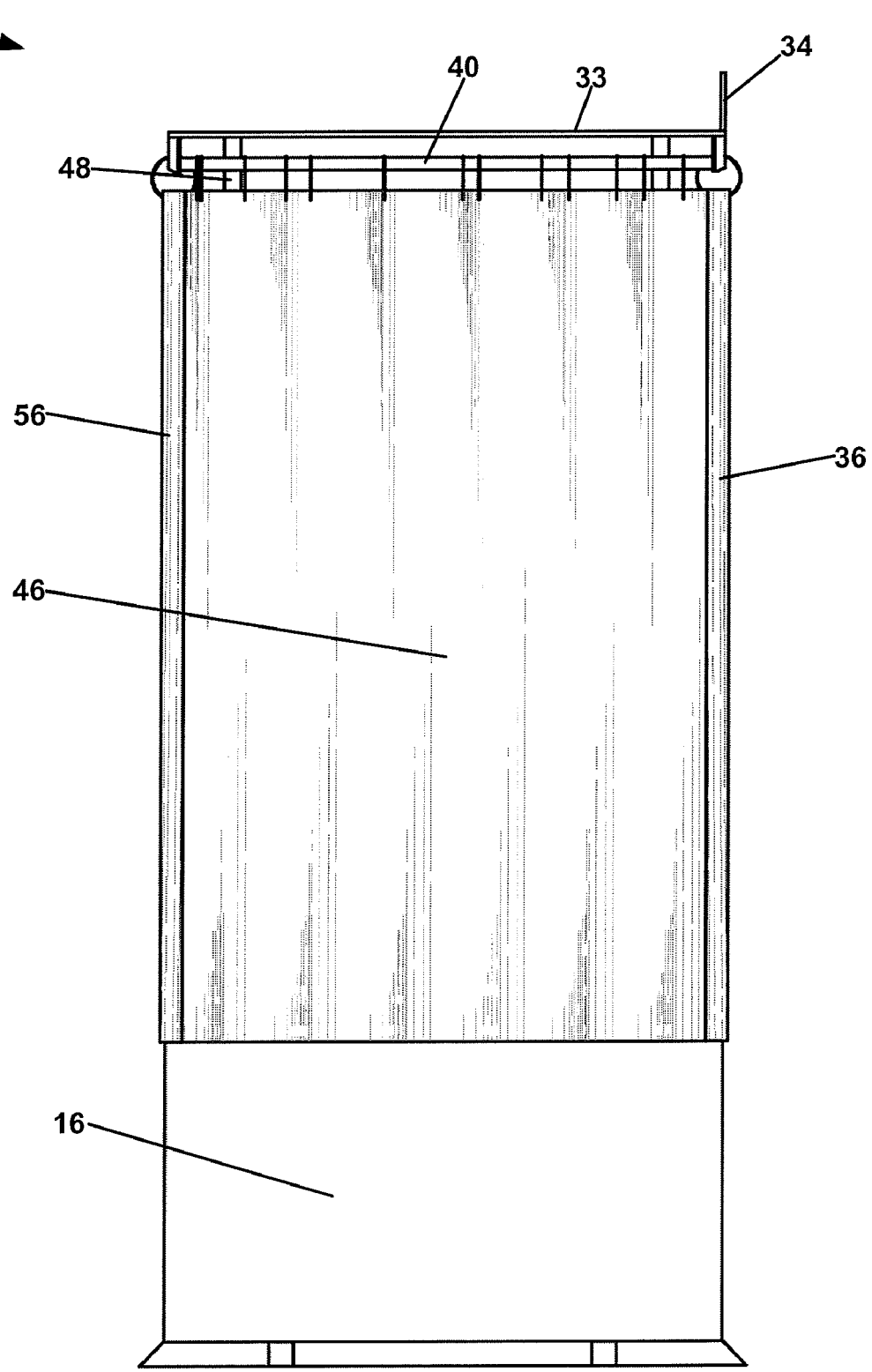
FIG. 1E is a rear view of the exemplary embodiment of the photo booth according to the present invention as shown in FIG. 1A.
Figure 1F:
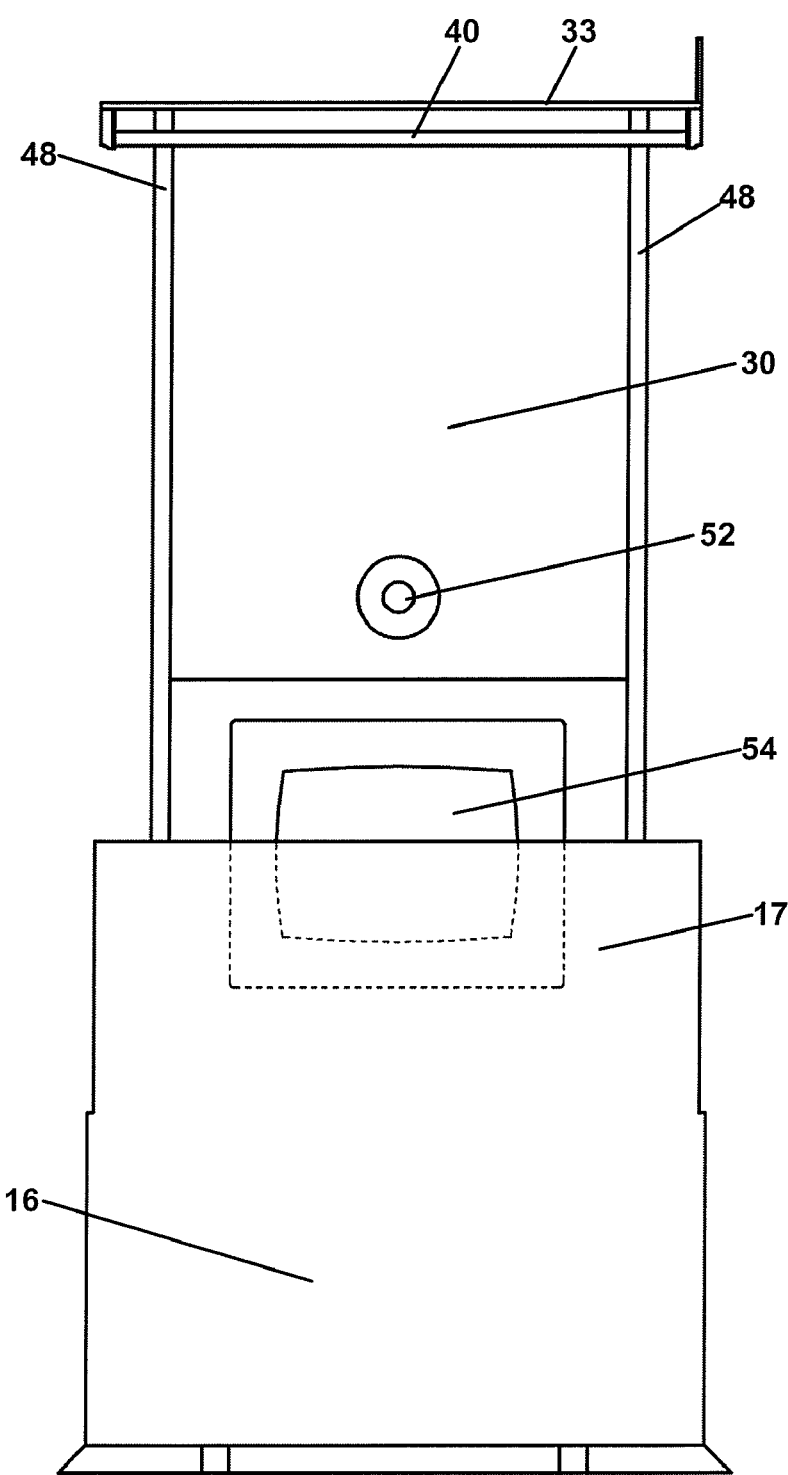
FIG. 1F is another rear view of the exemplary embodiment of the photo booth according to the present invention as shown in FIG. 1A with the curtain removed.

One or more exemplary embodiments of a photo booth 10 according to the present invention are shown in FIGS. 1A-1F. The photo booth 10 may include a floor 12, a lower front portion 20, an upper front portion 30, a bench 16, and curtains 36, 46, 56. FIGS. 1B, 1D, and 1F illustrate the photo booth 10 without any of the curtains 36, 46, and 56 to show the inside of the booth.

The front lower portion 20 of the photo booth 10 may include a shelf 22, a handle 24, a photo slot 26, and wheels 28. The shelf 22 may be used, e.g., as a tabletop for a photo strip album or guest book. The handle 24 and the wheels 28 may assist a user in transporting the booth. For example, a user may tilt the booth forward on the wheels 28 by leveraging the handle 24.

Generally, the photo booth 10 allows one or more user groups to enter the user space 50 (as shown, e.g., in FIG. 1B) to be imaged by the photo booth 10.

As described herein, a "user group" may be defined as one or more users. Generally, a user of the one or more users is a human. However, a user may be an animal, plant, and/or any other object that may be imaged by the imaging apparatus of the photo booth.

Also, as described herein, "user space" may be defined as any space included within the picture plane of the imaging apparatus of the photo booth.

Figure 18A:
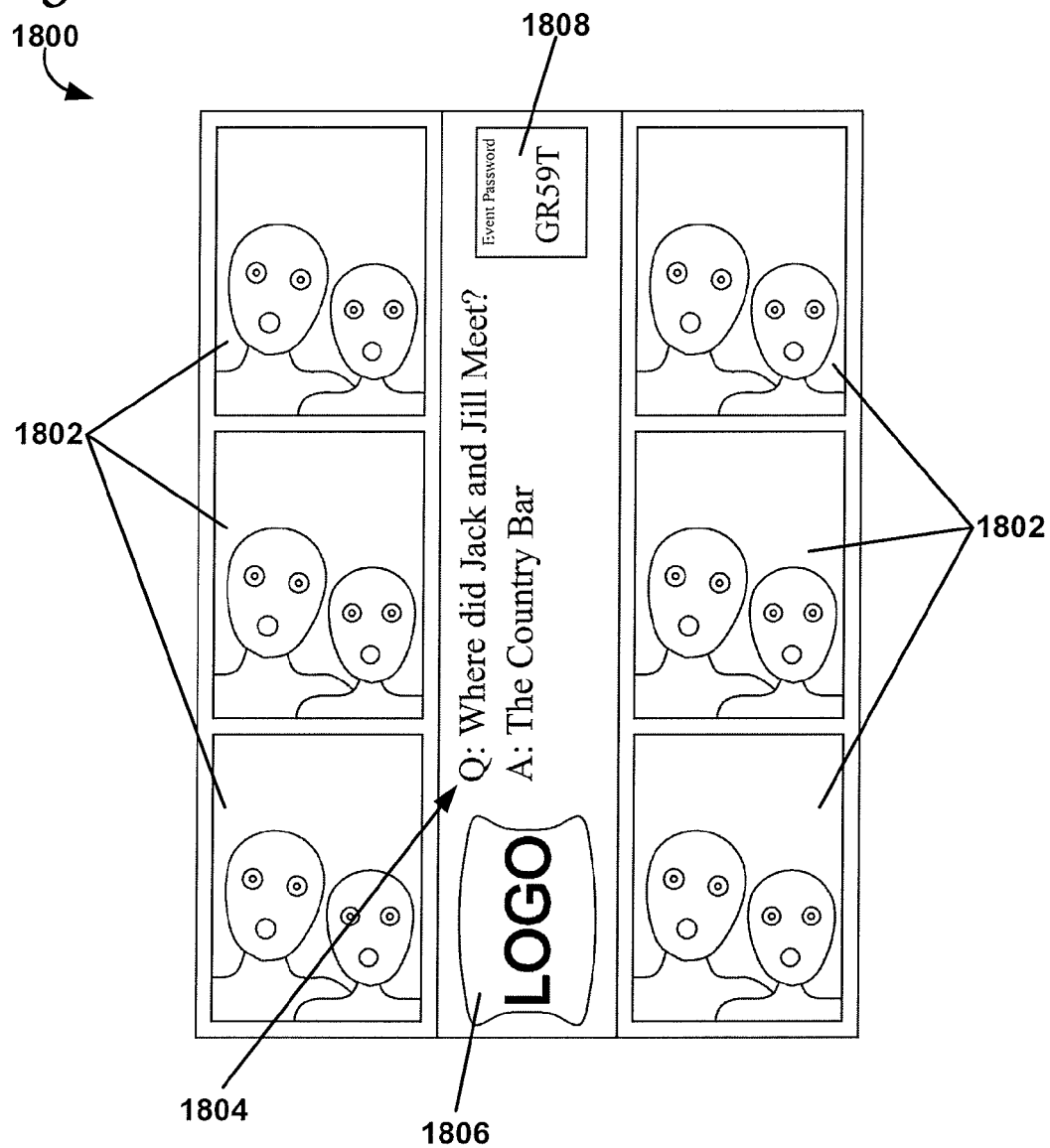
FIG. 18A depicts an exemplary photo strip generated by photo booth systems and/or methods of using photo booth systems according to the present invention, e.g., the method generally illustrated in FIG. 8.

The photo booth 10 may print the images on a photo strip (e.g., a photo strip as shown in FIG. 18A) and drop the photo strip into the slot 26. The slot 26 as depicted includes a center post that may stop of the photo strip from falling out of the slot 26.

The floor 12 may include a bevel 14 to, e.g., assist in preventing a user from tripping upon entering the user space 50 of the photo booth 10. The floor 14 may be connected to the bench 16. One or more users may sit on the bench 16 upon entering the user space 50 of the photo booth 10. The bench 16 may include hand rails 44 on either side of the photo booth 10.

Two upright posts 48 may extend between the bench 16 and the top 33 of the photo booth 10. Curtain rods 38, 40, and 42 may extend around the top 33 of the photo booth 10 and may hold the curtains 36, 46, and 56 around the photo booth 10. As depicted, the curtain rods 38, 40, and 42 utilize rings to the secure the curtains 36, 46, and 56 as shown in FIG. 1A.

The rear portion of the photo booth 10 may be "open" as shown in FIG. 1B. The rear portion may only be covered by a rear curtain such that one or more users may stand behind the "open" rear portion on the inside of the rear curtain 46 and still be within the user space to, e.g., be imaged by imaging apparatus of the photo booth 10.

The rear curtain rod 40 may be located at the rearmost portion of the photo booth 10 such that the rear curtain 46 hangs behind the back 17 of the bench 16 instead of in front of the back 17 of the bench 16. Having the rear curtain 46 hang behind the bench 16 may be desired to, e.g., facilitate users getting in and out of the booth, facilitate users entering the open rear portion, allow more users in the picture plane, preventing users from sitting on the curtain, and/or allowing users to have a curtain backdrop or no backdrop.

The photo booth 10 may include a sign 34. The sign 34 may display a company name, a party name, a customized message, notifications, and/or images.

The rear view of the photo booth 10 depicted FIG. 1F illustrates an imaging aperture 52 and a display 54. The imaging aperture 52 may be an opening within the front upper portion 30 of the photo booth 10 that allows imaging apparatus to image the user space 50 through the imaging aperture 52. The imaging aperture 52 may include translucent material, such as, e.g., glass or plastic, such that light may be transmitted from the user space 50 to the imaging apparatus that may be located within the front upper portion 30 of the photo booth 10 (e.g., the imaging apparatus may be isolated from the user space such that a user may not be able to directly interact with the imaging apparatus).

The display 54 may any device capable of visually transmitting information to a user in the user space 50. For example, the display 52 may be a liquid crystal display, a cathode ray tube, plasma display, projection display, an array of light emitting diodes, etc. Further, in this embodiment, the display 52 may also be a touch screen display by which a user may, e.g., initiate an imaging sequence or input information into the photo booth.

Figure 2:
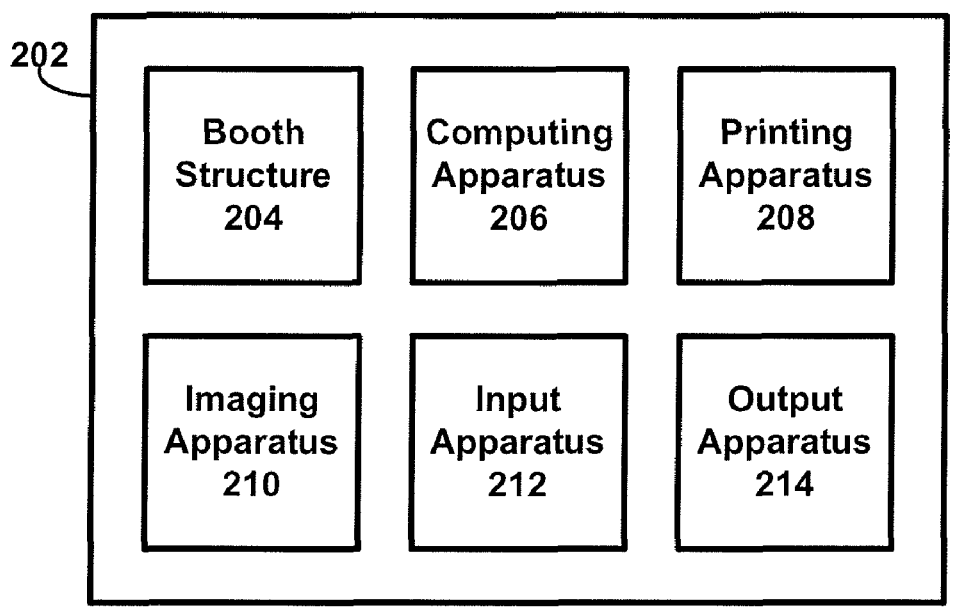
FIG. 2 is a general block diagram of an exemplary embodiment of a photo booth according to the present invention.

A general block diagram of one or more exemplary embodiments of a photo booth 202 according to the present invention is shown in FIG. 2. The photo booth 202 may include booth structure 204, computing apparatus 206, printing apparatus 208, imaging apparatus 210, input apparatus 212, and output apparatus 214.

The booth structure 204 may include the physical portions of the photo booth 202. For example, the booth structure 204 may include the walls, floor, wheels, curtains, curtain rods, etc. The booth structure 204 may be formed of wood, metal, plastic, and/or any other material as would be known by one skilled in the art.

The computing apparatus 206 may include one or more computing devices capable of processing data. The computing apparatus 206 may include, e.g., microprocessors, data storage (e.g., volatile or non-volatile memory and/or storage elements), input devices, output devices, etc. The computing apparatus 206 may be programmed to implement the methods or portions of the methods described herein and may be operably coupled to the printing apparatus 208, the imaging apparatus 210, the input apparatus 212, and/or the output apparatus 214.

As described herein, "operably coupled" may be defined as connected (e.g., wired or wirelessly) such that information (e.g., image data, commands, etc.) may be transmitted between each object.

The methods described herein may be implemented by program code and/or logic. Program code and/or logic described herein may be applied to input data to perform functionality described herein and generate desired output information. The output information may be applied as input to one or more other devices and/or processes as described herein or as would be applied in a known fashion.

The program code and/or logic used to implement the present invention may be provided using any programmable language, e.g., a high level procedural and/or object orientated programming language that is suitable for communicating with computing apparatus. Any such program code and/or logic may, for example, be stored on any suitable device, e.g., a storage media, readable by a general or special purpose program, computer or a processor apparatus for configuring and operating the computer when the suitable device is read for performing the procedures described herein. In other words, at least in one embodiment, the computing apparatus 206 may be implemented using a computer readable storage medium, configured with a computer program, where the storage medium so configured causes the computing apparatus 206 to operate in a specific and predefined manner to perform functions described herein.

At least in one embodiment, the computing apparatus 206 may be, for example, any fixed or mobile computer system (e.g., a personal computer or mini computer). The exact configuration of the computing apparatus 206 is not limiting and essentially any device capable of providing suitable computing capabilities may be used according to the present invention.

In view of the above, it will be readily apparent that the functionality as described in one or more embodiments according to the present invention may be implemented in any manner as would be known to one skilled in the art. As such, the computer language, the computing apparatus, or any other software/hardware which is to be used to implement the present invention shall not be limiting on the scope of the processes or programs (e.g., the functionality provided by such processes or programs) described herein.

The printing apparatus 208 may be any device capable of printing images. For example, the printing apparatus 208 may be a laser printer, ink jet printer, dye sublimation printer, dot matrix printer, three-dimensional printer, collating machine, and/or binding machine. The printing apparatus 208 may be operably coupled to the computing apparatus 206 such that the printing apparatus 208 may, e.g., receive commands from the computing apparatus 206, receive data (e.g., imaging data) from the computing apparatus 206, etc.

The imaging apparatus 210 may be any device capable of imaging the user space of the photo booth 202. For example, the imaging apparatus may include one or more image capturing devices, e.g., digital cameras and/or digital video cameras. The imaging apparatus 210 may also include illumination apparatus, such as, e.g., light boxes, flashes, cone lights, light-emitting diodes, incandescent lights, florescent lights, and/or halogen lights. Also, the imaging apparatus 210 may be operably coupled to the computing apparatus 206 such that the computing apparatus 206 may, e.g., send commands to the imaging apparatus 210 and/or receive data (e.g., imaging data) from the imaging apparatus 210.

The input apparatus 212 may be any device capable of receiving input from a user group. For example, the input apparatus 212 may include buttons, switches, touch screens, microphones, joysticks, track balls, keyboards, mice, disk drives (e.g., hard disk drives, CD-ROM drives, DVD drives, floppy disk drives), data ports (e.g., universal serial bus ports or serial ports), scanners, and/or bar code scanners. The input apparatus 212 may be operably coupled to the computing apparatus 206 such that the computing apparatus 206 may, e.g., receive commands from the input apparatus 212 and/or receive data from the input apparatus 212.

The output apparatus 214 may be any device capable of transmitting information to a user group. The output apparatus 214 may be operably coupled to the computing apparatus 206 such that the computing apparatus 206 may, e.g., utilize the output apparatus 214 to transmit information to a user group. Various examples of output apparatus 214 are described herein with respect to FIG. 5.

Figure 3:
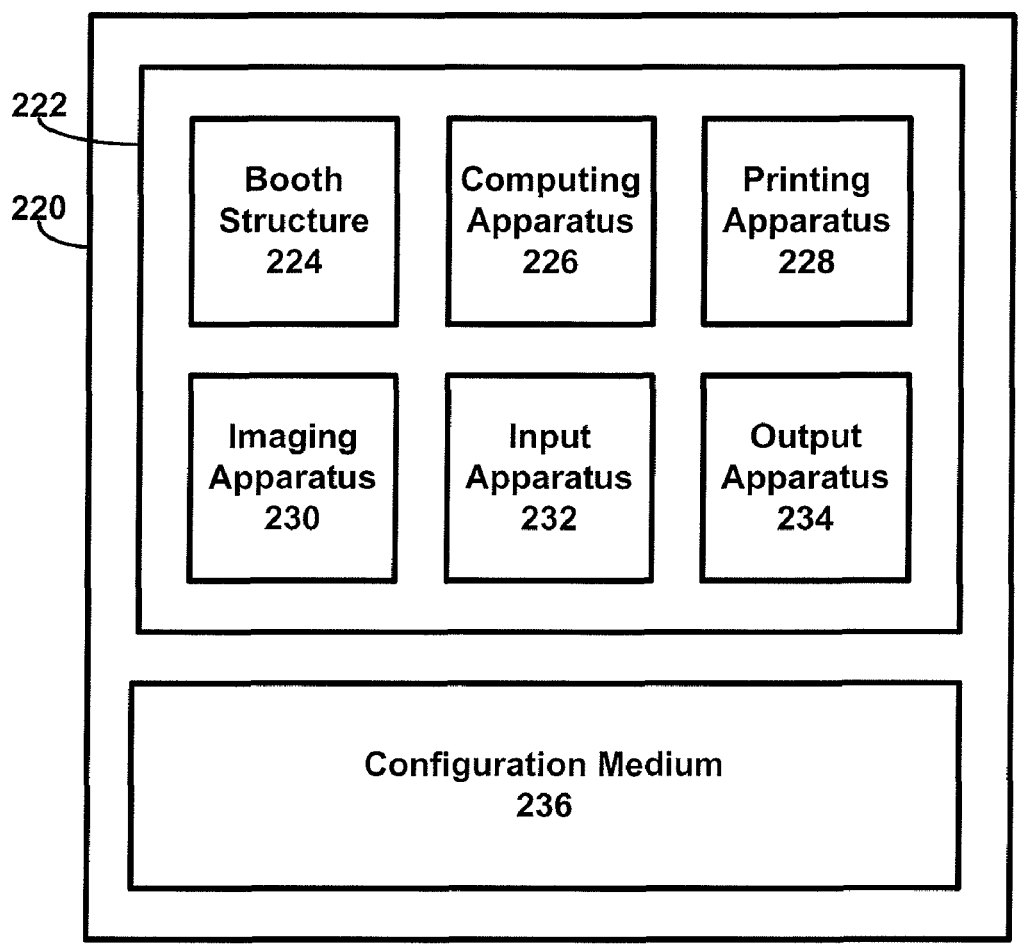
FIG. 3 is a general block diagram of an exemplary embodiment of a photo booth system according to the present invention.

A general block diagram of one or more exemplary embodiments of a photo booth system 220 according to the present invention is shown in FIG. 3. The photo booth system 220 may include a photo booth 222 and a configuration medium 236.

The photo booth 222 may be similar to the photo booth 202 described herein with reference to FIG. 2. For example, booth structure 224, computing apparatus 226, printing apparatus 228, imaging apparatus 230, input apparatus 232, and output apparatus 234 may be substantially similar to the booth structure 204, computing apparatus 206, printing apparatus 208, imaging apparatus 210, input apparatus 212, and output apparatus 214. As such, for simplicity, further description on the details of photo booth 222 shall not be provided.

The configuration medium 236 may be any device capable of carrying data and operably couplable to the input apparatus 232 to transmit information from the configuration medium 236 to the computing apparatus 226 of the photo booth 222. For example, the configuration medium 236 may include universal serial bus storage (USB) device (e.g., a "memory key"), a CD-ROM, a DVD, a floppy disk, etc. At least in one embodiment, the configuration medium 236 may include a laptop computer that may be interfaced with the computing apparatus 226 of the photo booth 222.

Figure 15:
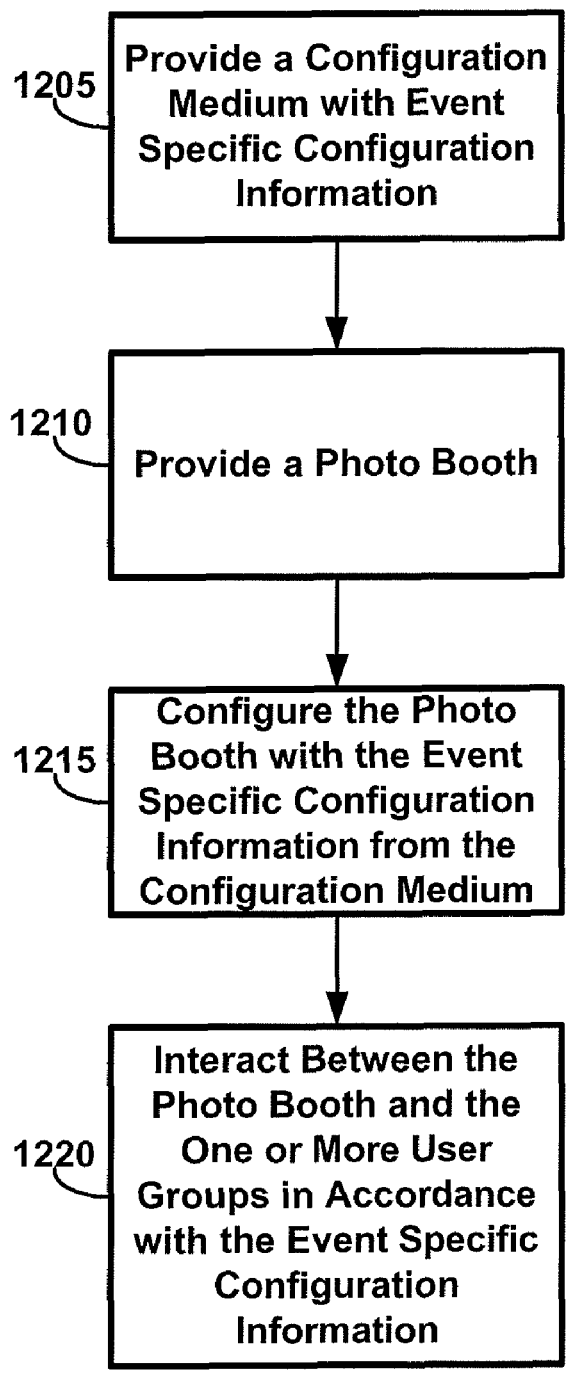
FIG. 15 is a general block diagram of another exemplary method of using a photo booth according to the present invention.

One or more exemplary methods of using a photo booth system that includes a configuration medium are described in further detail herein with reference to FIG. 15.

Figure 4:
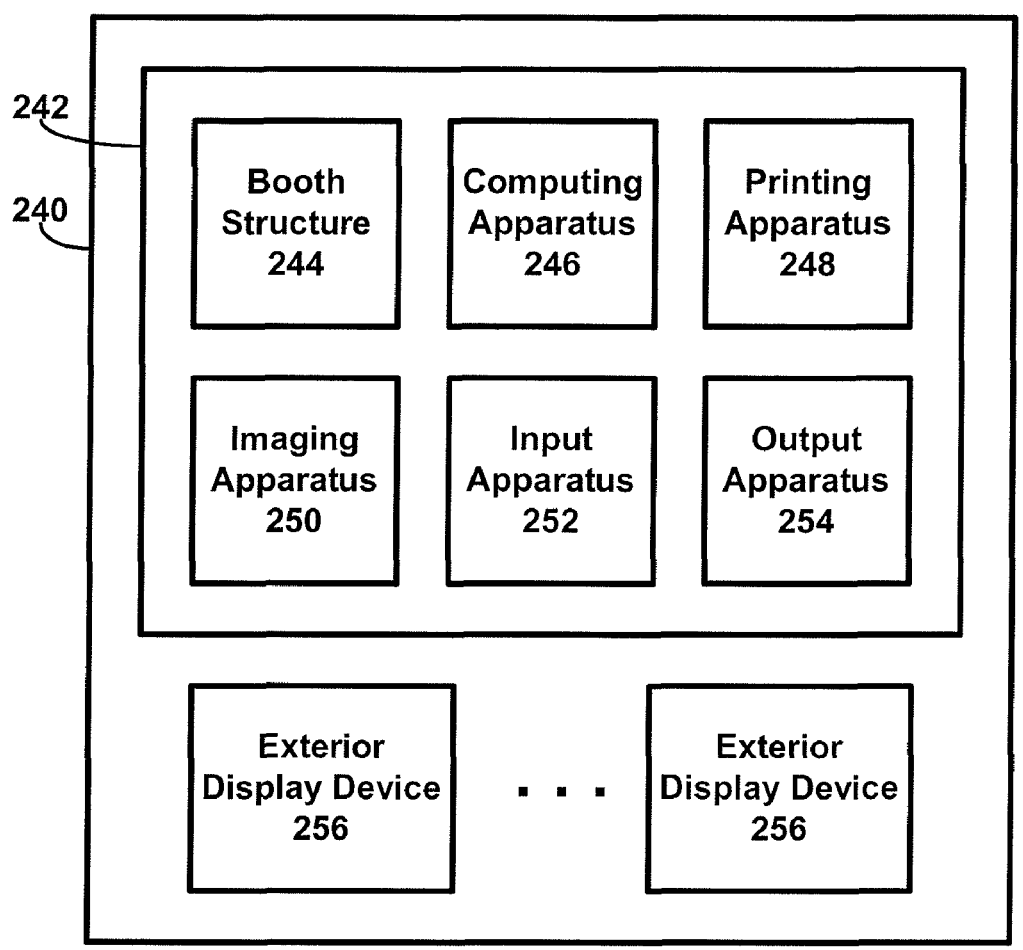
FIG. 4 is a general block diagram of another exemplary embodiment of a photo booth system according to the present invention.

A general block diagram of one or more exemplary embodiments of a photo booth system 240 according to the present invention is shown in FIG. 4. The photo booth system 240 may include a photo booth 242 and two or more exterior display devices 256.

The photo booth 242 may be similar to the photo booth 202 described herein with reference to FIG. 2. For example, booth structure 244, computing apparatus 246, printing apparatus 248, imaging apparatus 250, input apparatus 252, and output apparatus 254 may be substantially similar to the booth structure 204, computing apparatus 206, printing apparatus 208, imaging apparatus 210, input apparatus 212, and output apparatus 214. As such, for simplicity, further description on the details of photo booth 242 shall not be provided.

The exterior display devices 256 may be any display device capable of displaying information outside of the user space of the photo booth 242 and operably couplable to the computing apparatus 246 of the photo booth 242 to receive information (e.g., imaging data) from the computer apparatus 246. For example, the exterior display devices 256 may include liquid crystal displays, cathode ray tubes, plasma displays, projection displays, projectors, arrays of light emitting diodes, etc.

Figure 12:
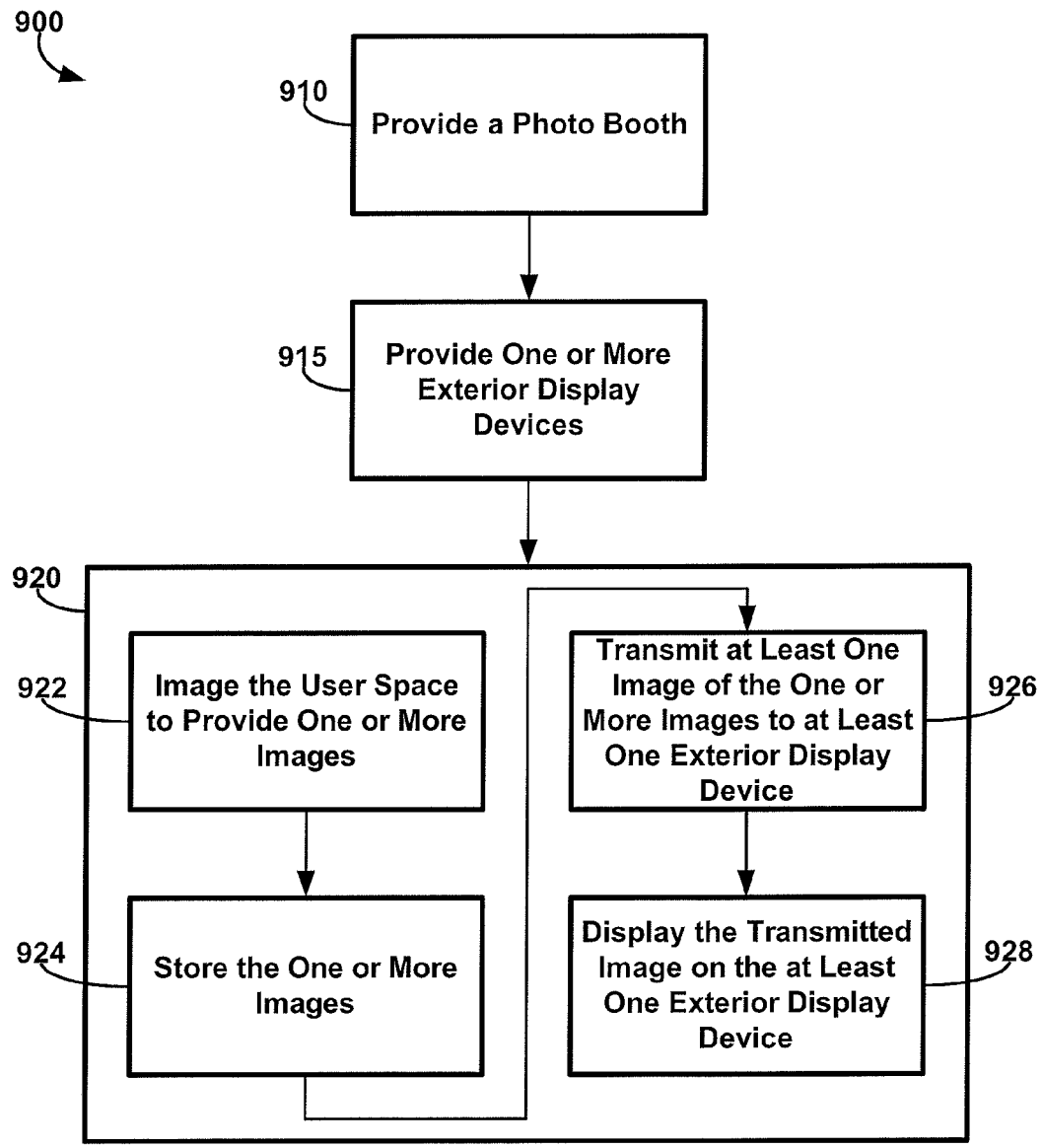
FIG. 12 is a detailed block diagram of another exemplary method of using a photo booth according to the present invention.

One or more exemplary methods of using a photo booth system that includes exterior display devices are described in further detail herein with reference to FIG. 12.

Figure 5:
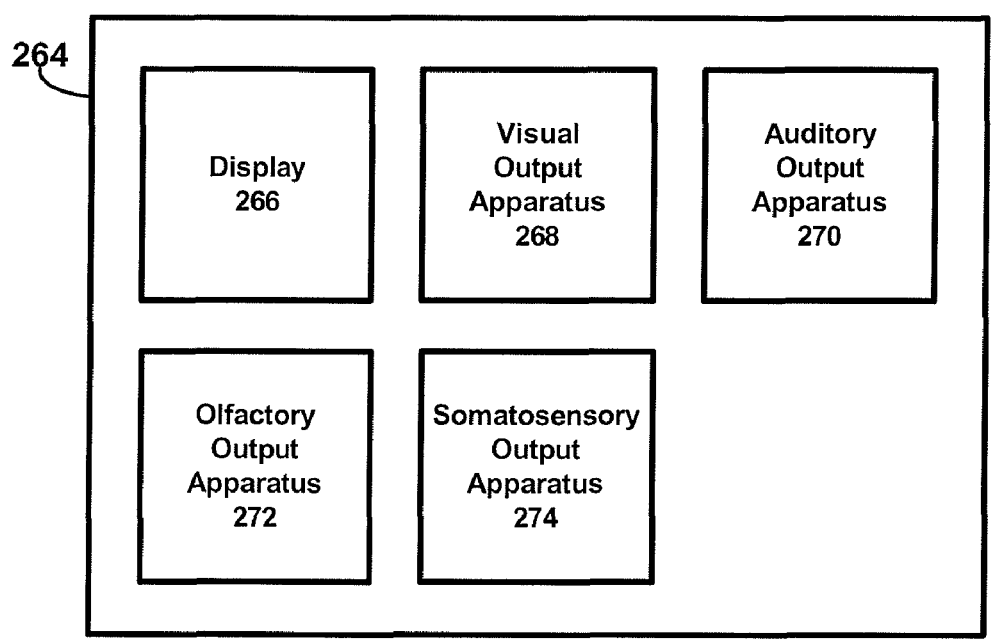
FIG. 5 is a general block diagram of exemplary output apparatus of a photo booth as shown in FIG. 2.

A general block diagram of one or more exemplary embodiments of output apparatus 264 of a photo booth according to the present invention is shown in FIG. 5. The output apparatus 264 may include, e.g., a display 266, visual output apparatus 268, auditory output apparatus 270, olfactory output apparatus 272, somatosensory output apparatus 274, and any other output apparatus as would be known by one having ordinary skill in the art.

The display 266 may be any device capable of visually transmitting information to a user in the user space. For example, the display 266 may be a liquid crystal display, a cathode ray tube, plasma display, projection display, an array of light emitting diodes, etc. Further, in at least one embodiment, the display 266 is also a touch screen display (which may operate as an input apparatus) by which a user may, e.g., initiate an imaging sequence or input information into the photo booth.

The visual output apparatus 268 may be any device that may output visual stimulus to a user group. For example, the visual output apparatus 268 may be one or more incandescent lights, liquid crystal displays, cathode ray tubes, plasma displays, projection displays, and/or arrays of light emitting diodes. In at least one embodiment, the visual output apparatus 268 may be utilized to provide a "flash" in the user space of the photo booth to illuminate the user group during imaging. In at least another embodiment, the visual output apparatus 268 may be utilized to startle a user group with, e.g., bright, bizarre lights.

The auditory output apparatus 270 may be any device that may output auditory stimulus to a user group. For example, the auditory output apparatus 270 may be one or more speakers, horns, drums, whistles, and/or cymbals. In at least one embodiment, the auditory output apparatus 270 may be utilized to signal to the user group that the photo booth will be imaging the user space. In at least another embodiment, the auditory output apparatus 270 may be utilized to startle a user group with, e.g., loud, obnoxious sounds.

The olfactory output apparatus 272 may be any device that may output olfactory stimulus to a user group. For example, the olfactory output apparatus 272 may be stink bombs, foul-smelling sprays, and/or potpourri sprays. In at least one embodiment, the olfactory output apparatus 272 may be utilized to startle a user group with, e.g., disgusting, repulsive smells.

The somatosensory output apparatus 274 may be any device that may output somatosensory stimulus to a user group. As described herein, somatosensory stimulus may be defined as sensations perceived by the skin and/or internal organs of a user. For example, the somatosensory output apparatus 274 may include vibration generators, gas sprays, liquid sprays, feathers, fur and/or air (e.g., hot or cold air). In at least one embodiment, the somatosensory output apparatus 274 may be utilized to startle a user group by, e.g., unexpected vibrations of the photo booth.

Figure 6:
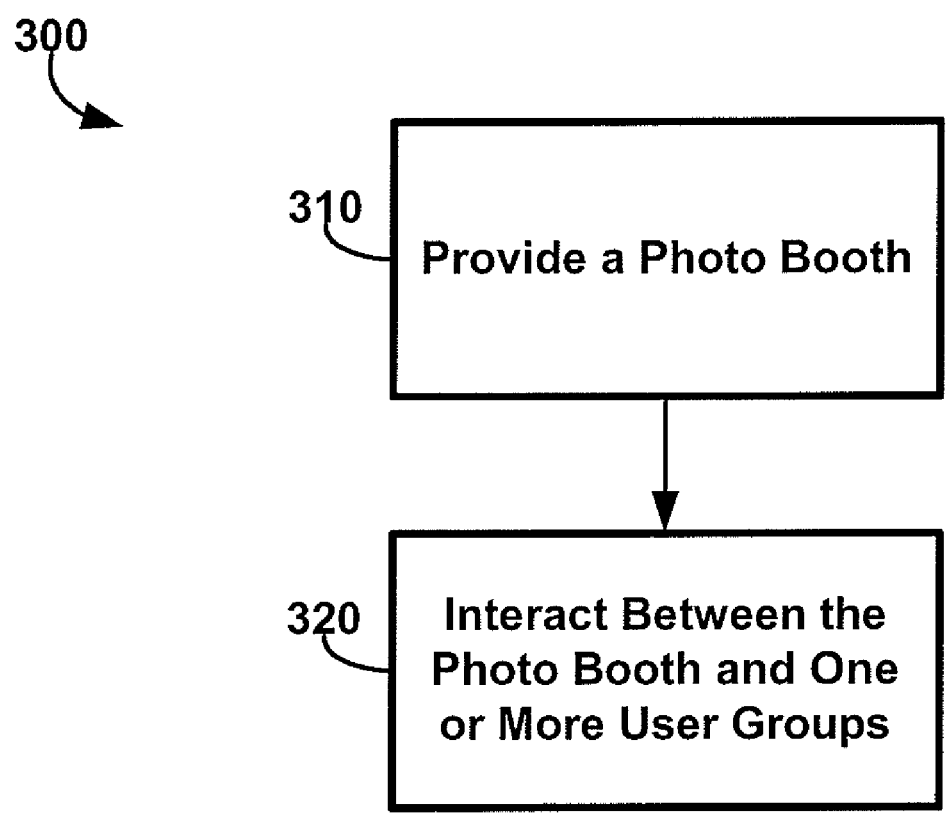
FIG. 6 is a general block diagram of an exemplary method of using a photo booth according to the present invention.

A general block diagram of one or more exemplary methods 300 of using a photo booth according to the present invention is shown in FIG. 6. The method 300 may include providing a photo booth (block 310) such as those described herein and interaction between the photo booth and one or more user groups (block 320).

The photo booth provided in block 310 may be similar to the photo booth 202 described herein with reference to FIG. 2. As such, for simplicity, further description on the details of providing a photo booth shall not be provided.

Interacting between the photo booth and one or more user groups (block 320) may include a plurality of different interactions. Many of the different interactions are further described herein with reference to FIGS. 7-11 and 13. For example, interactions between the photo booth and one or more user groups may include a picture taking process, a picture manipulating process and/or a quiz game.

Figure 7:
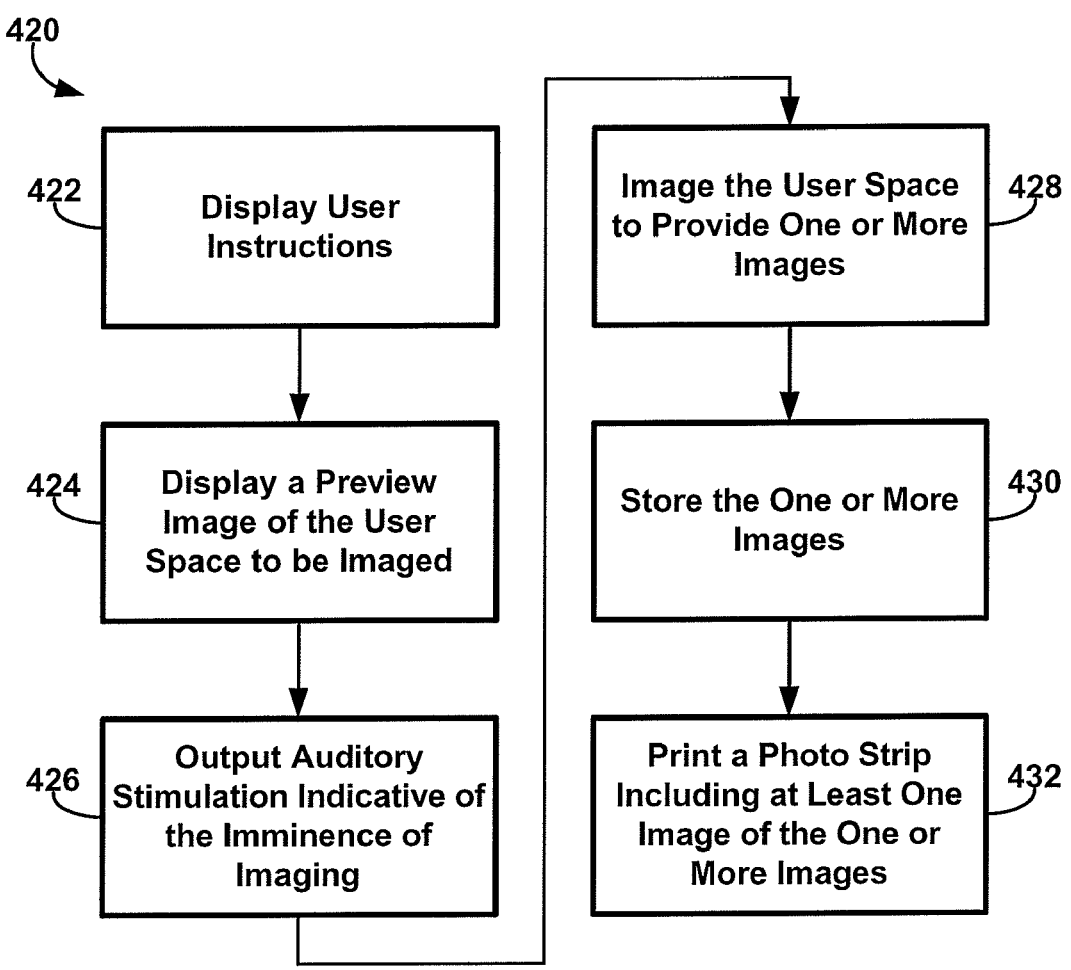
FIG. 7 is a detailed block diagram of an exemplary method of interacting between a photo booth and one or more users groups as generally illustrated in the method of FIG. 6.

A detailed block diagram of one or more exemplary methods 420 of interacting between a photo booth and one or more users groups is illustrated in FIG. 7. The method 420 may include displaying user instructions (block 422). The user instructions may be either static or dynamic.

Static user instructions (i.e., instructions that do not change) may be fixed on the photo booth proximate the user space of the photo booth to, e.g., notify a user group of the operation of the photo booth. For example, in at least one embodiment, a button on the inside of the photo booth may initiate the imaging sequence. Static user instructions, such as, "Press the Big Red Button to Start" may be printed/painted on the photo booth proximate the button such that a user group would be able to read the user instructions and understand how to start the imaging sequence or "Look Here" may be printed/painted on the photo booth proximate the imaging aperture.

Dynamic user instructions (i.e., instructions that may change) may be shown on a display proximate the user space of the photo booth. A computer apparatus may send different user instructions to the display depending on what methods the photo booth is executing. For example, in at least one embodiment of a general imaging method, a display of the photo booth may show a countdown ("5 . . . 4 . . . 3 . . . 2 . . . 1 . . . Go!") that signals to the user group when the user space is about to be imaged.

Further, user instructions may be inputted by an administrator and may be any user instructions the administrator desires. For example, the user instructions may include "Look Up," "Look at the Camera," "Smile," "Processing . . . Please Wait a Moment," a legal disclaimer regarding copyright/on-line publication, "Lean Back," Heads Together," etc.

User instructions are not, e.g., limited to textual instructions. Use instructions may include spoken commands, various sounds, various visual output, somatosensory output, olfactory output, etc. For example, user instructions may include the spoken command "Look Up!"

Figure 16A:
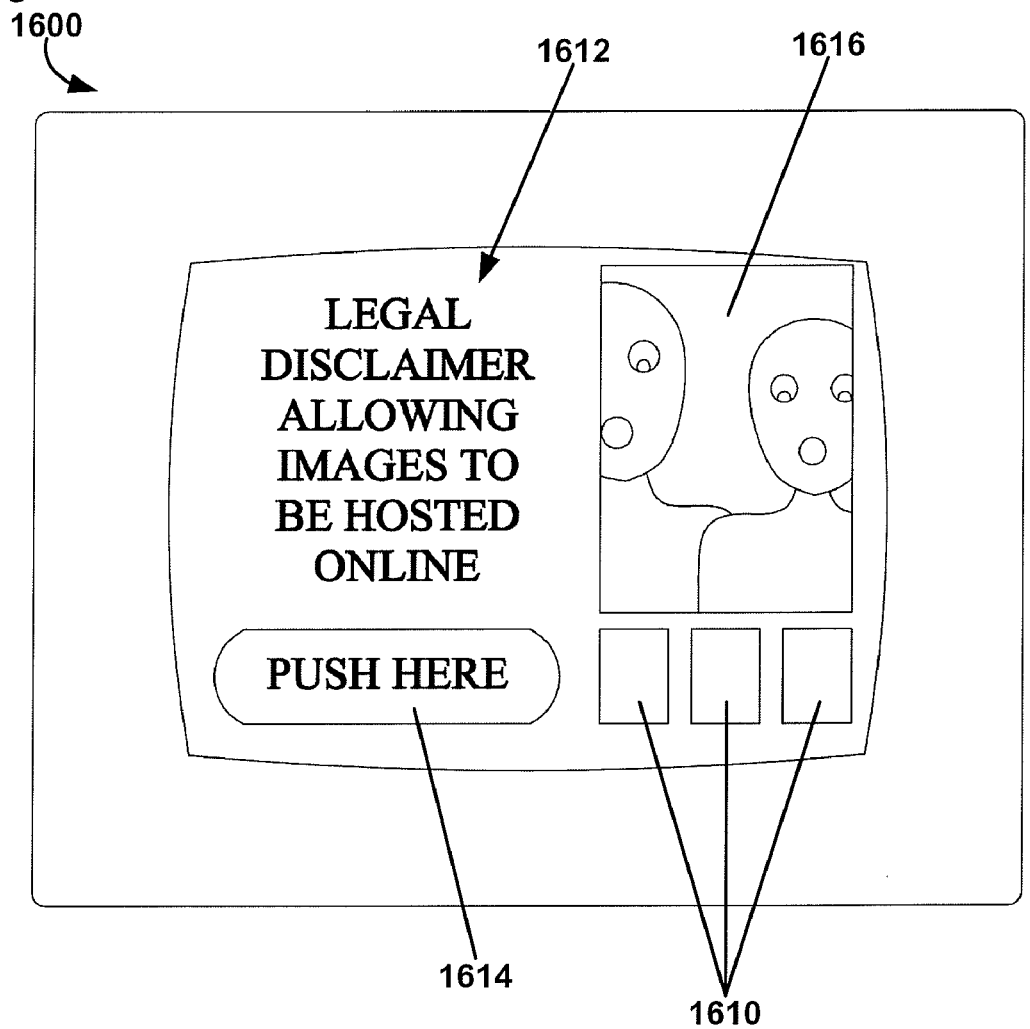
FIGS. 16A-I depict exemplary screen displays of a photo booth executing a method according to the present invention, e.g., the method generally illustrated in FIG. 7.
Figure 16B:
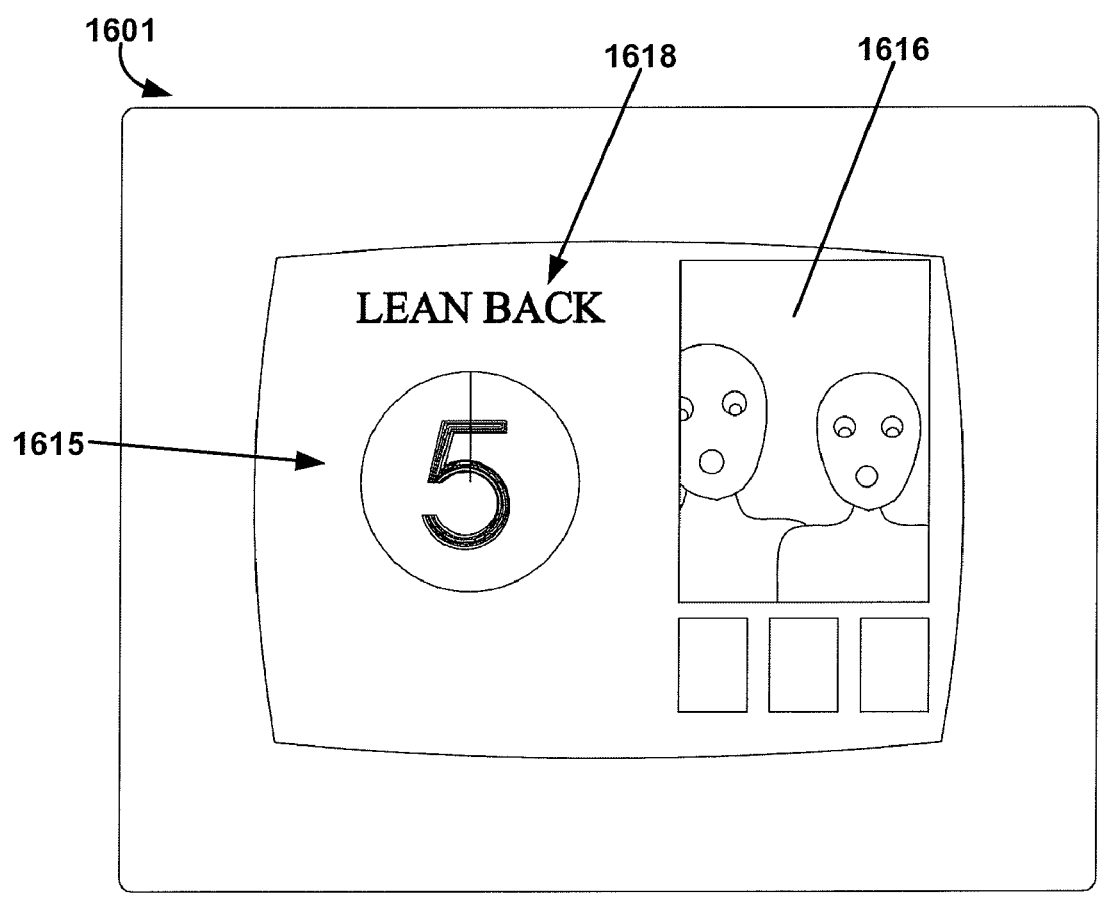
Figure 16C:
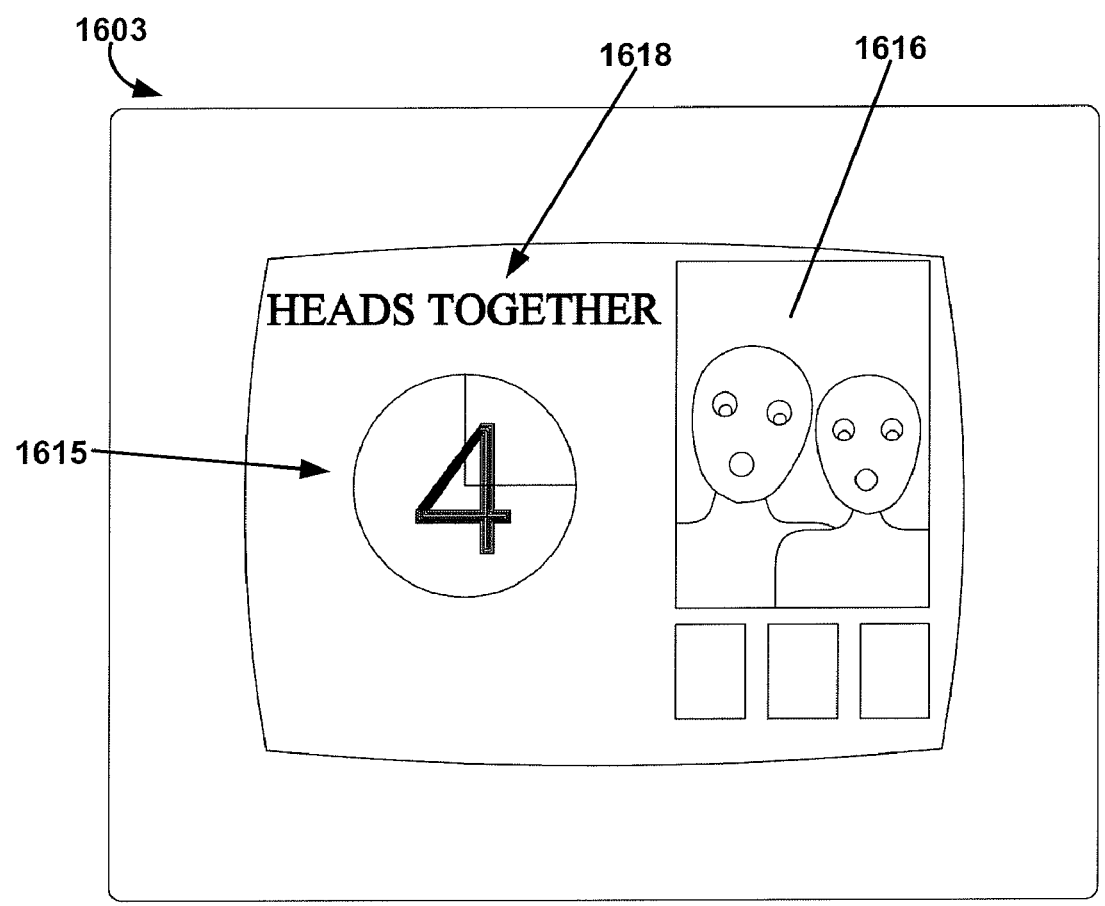
Figure 16D:
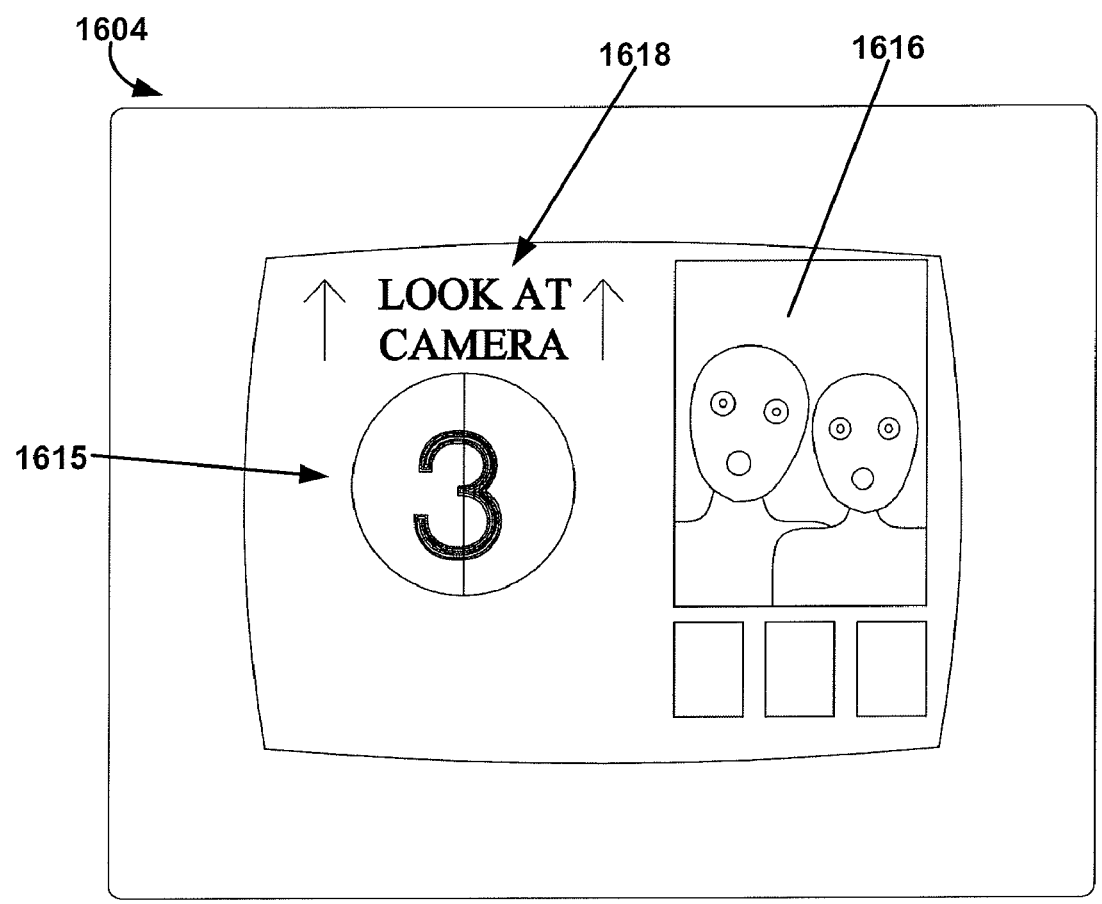
Figure 16E:
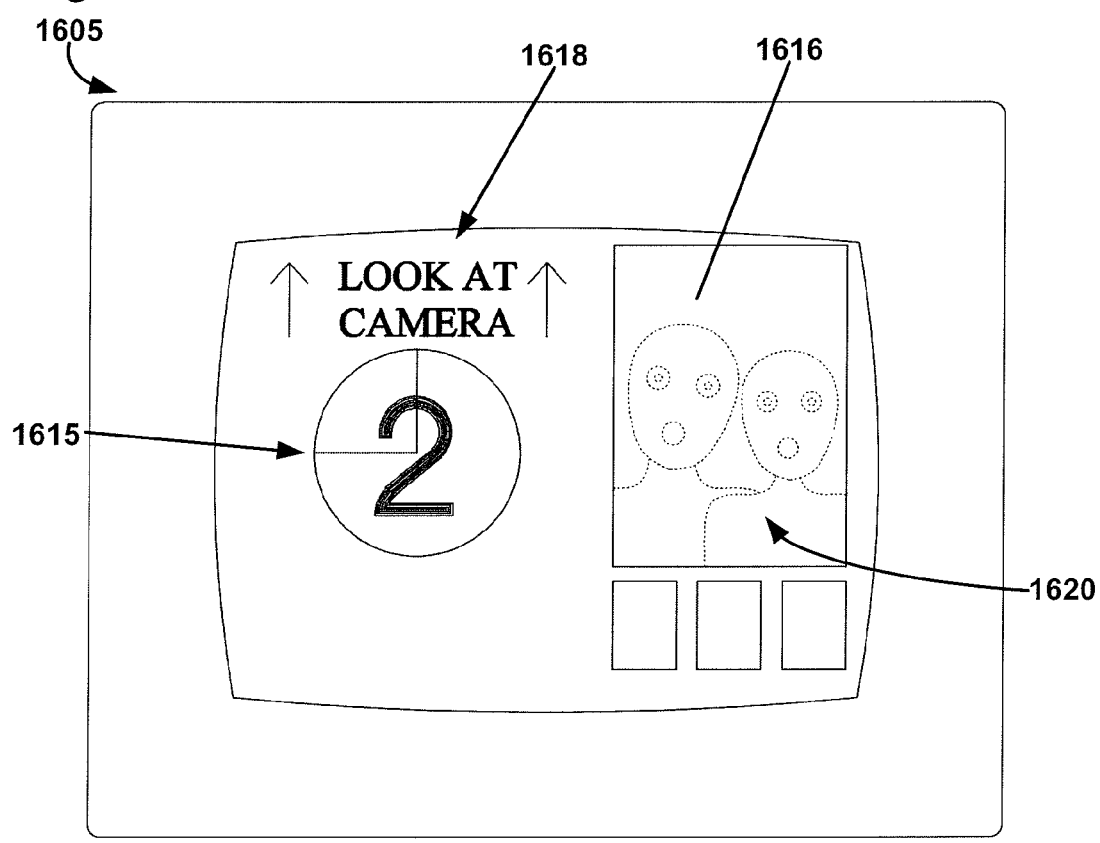
Figure 16F:
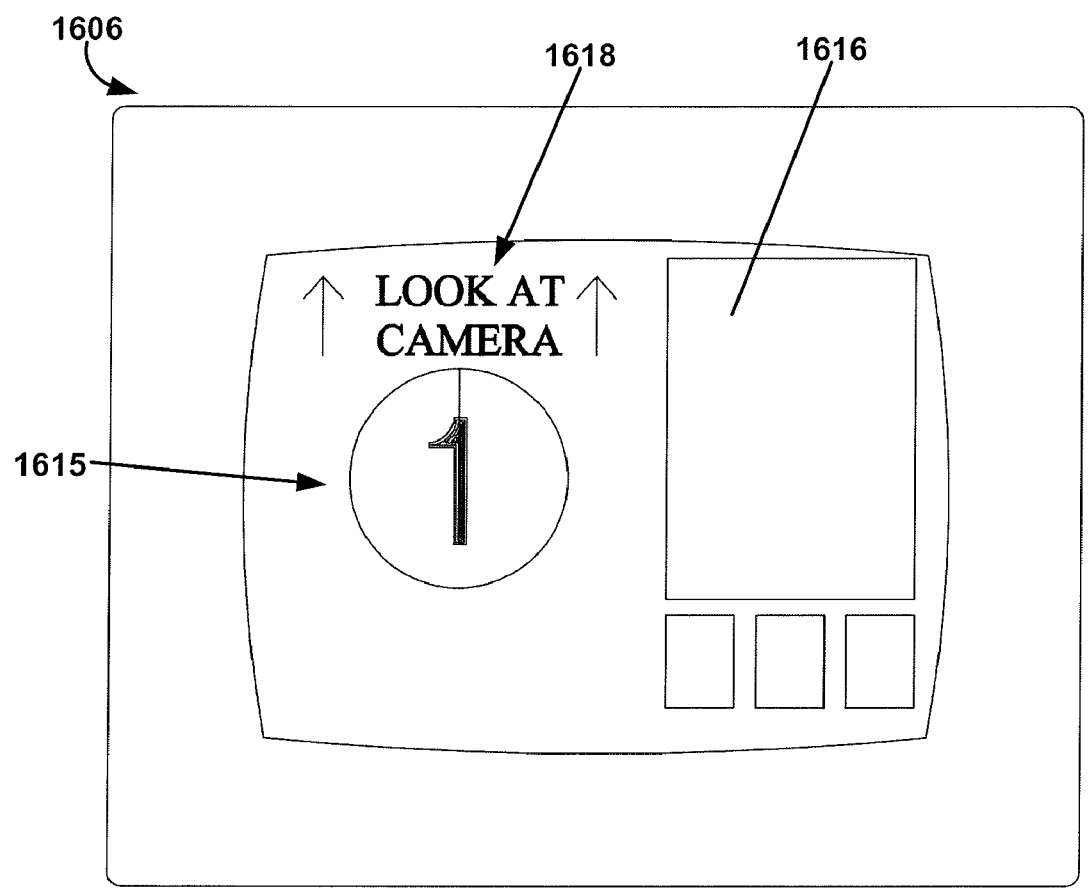
Figure 16G:
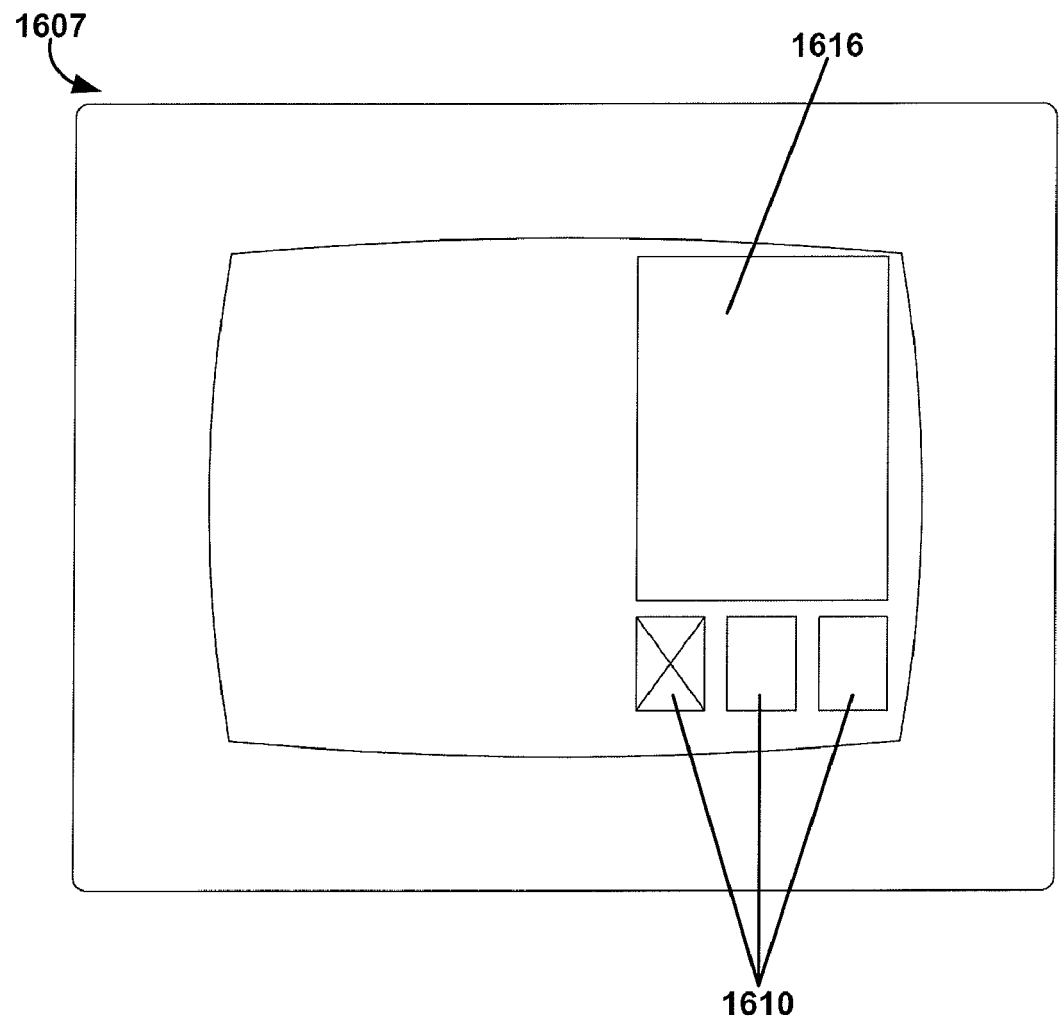
Figure 16H:
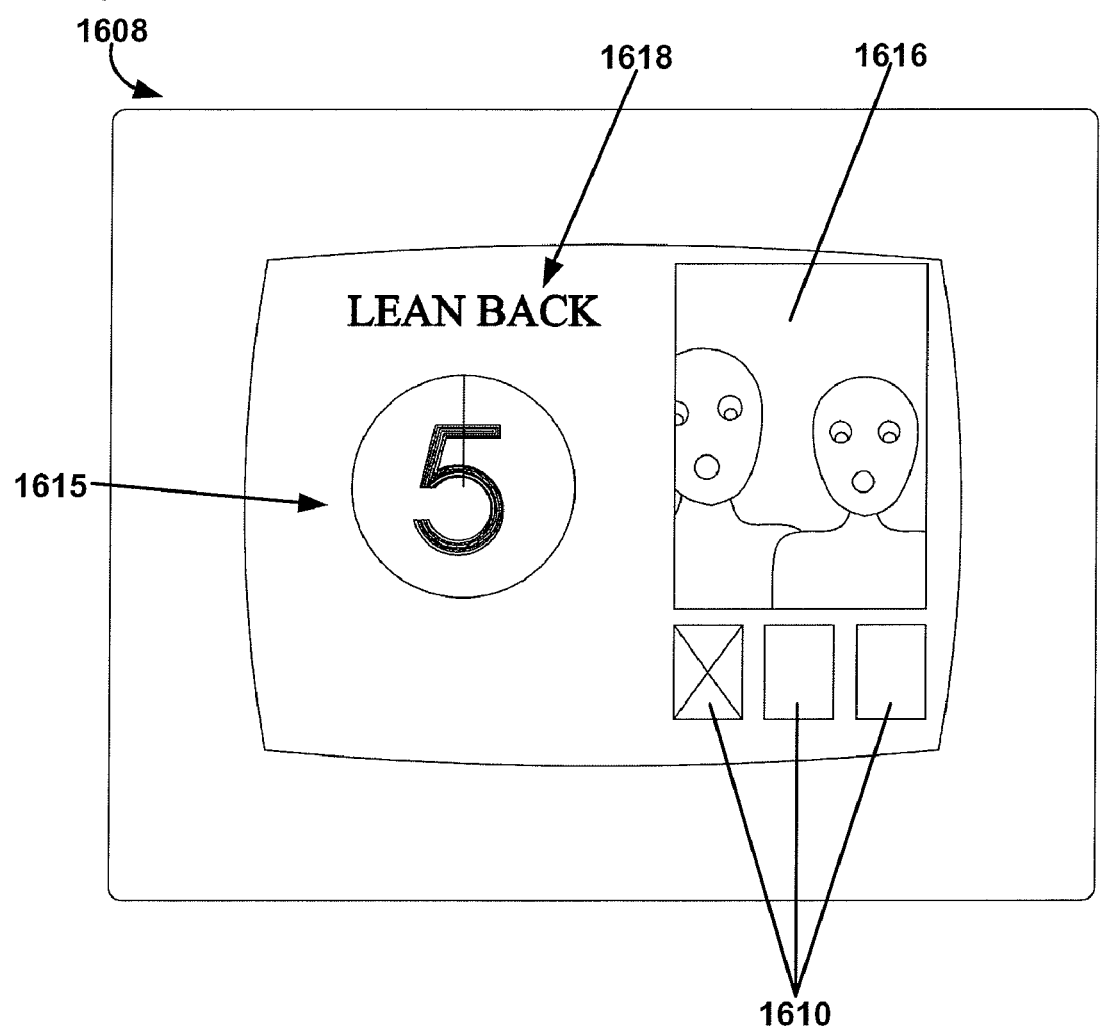

One or more exemplary embodiments of displaying dynamic user instructions (block 422) are depicted in the screen displays of FIGS. 16A-I, which may depict an exemplary imaging sequence. The imaging sequence for capturing a first image of the user space may begin in FIG. 16A and end in FIG. 16G. The imaging sequence may then start over again in screen display 1608 as shown in FIG. 16H, which is similar to the screen display 1600 of FIG. 16A. The imaging sequence may loop two or more times to provide two or more images (e.g., FIGS. 16A-G). After done looping, the method may finish with screen display 1609 of FIG. 16I.

The screen display 1600 of FIG. 16A shows the following user instructions: "Legal Disclaimer Allowing Images to Be Hosted Online" 1612 and "Push Here" 1614. The "Legal Disclaimer" 1612 may instruct the user group of, e.g., legalities concerning copyright and online publication. "Push Here" 1614 may instruct the user group to simply "Push Here" to start the imaging sequence.

The screen displays of FIGS. 16B-F display the following user instruction: a countdown timer 1615. The countdown timer 1615 counts 5 . . . 4 . . . 3 . . . 2 . . . 1 (as shown in FIGS. 16B-F) before the photo booth images the user space. Further, each screen display of FIGS. 16B-F shows additional user instructions 1618. For example, screen display 1601 of FIG. 16B shows the user instruction 1618 "Lean Back." Further, for example, screen display 1603 of FIG. 16C shows the user instruction 1618 "Heads Together." Still further, for example, the screen displays 1604, 1605, and 1606 of FIGS. 16D-F show the user instruction 1618 "Look at Camera" with arrows pointing upwardly towards the imaging aperture.

The method 420 may further include displaying a preview image of the user space to be imaged (block 424). The preview image of the user space to be imaged may be shown on the display, e.g., display 54 of FIG. 1F. The preview image may be a digital image updated, e.g., five times a second. At least in one embodiment, the preview image may be real-time video of the user space of the photo booth. Further, at least in one embodiment, the preview image may be video from a secondary camera of the imaging apparatus.

One or more exemplary embodiments of displaying a preview image of the user space to be imaged (block 424) are depicted in the screen displays of FIGS. 16A-H. Generally, the preview image may be displayed before the user space is imaged by the imaging apparatus and may be faded and/or disappears entirely before the use space is imaged by the imaging apparatus. The fading and/or disappearance may indicate to the user group to stop looking at the preview image and to look directly at the camera. For instance, the preview image 1616 in the screen displays of FIGS. 16A-H shows a preview image of the user space to be imaged. Note that the preview image 1616 of screen display 1605 of FIG. 16E is dotted, which indicates that the preview image has begun to fade. In screen display 1606 of FIG. 16F, the preview image 1616 has faded almost completely or has disappeared, which may indicate that the user space is about to be imaged. The blank preview image may prompt the user group to "look up" at the camera instead looking at the preview image. Further, the blank preview image adds to the suspense and/or surprise of the user group upon reviewing the images of the photo strip because the user group was not able to the preview image immediately before the images were taken.

The method 420 may further include outputting auditory stimulation indicative of the imminence of imaging (block 426). The auditory stimulation may be any sound that would indicate to a user that the user space is about to be imaged, or is being imaged. In essence, this auditory stimulation may be a "countdown" sound. For example, at least in one embodiment, the auditory stimulation may include a sound increasing in pitch and a "popping" sound.

Further for example, at least in another embodiment, the auditory stimulation may include a voice counting down "5 . . . 4 . . . 3 . . . 2 . . . ." Still further for example, at least in another embodiment, the auditory stimulation may include "Put your heads together, look at the camera and smile." For example, with reference to FIGS. 16A-I, the auditory stimulation may start at a low pitch in FIG. 16A and increase to a high pitch by FIG. 16F.

The method 420 may further include imaging the user space with imaging apparatus to provide one or more images (block 428). Each image of the one or more images may be taken one-at-a-time or all the images may be taken in succession. In at least one embodiment, each image is taken after user instructions and a countdown displayed on the display such that the user group is ready for each picture. Generally, the photo booth may take three images for each user group. The three images may be printed twice on the same photo strip as shown in photo strip 1800 of FIG. 18A.

For example, after screen display 1606 of FIG. 16F is displayed, the imaging apparatus may image the user space of the photo booth (block 428). Screen display 1607 may be shown after an image has been taken and may include a blank preview image 1616 and an "X" through one of the image status indicators 1610 signifying that one image of the three possible images has been taken. At least in one embodiment, instead of an "X," each of the image status indicators 1610 may display the actual image taken or, in the alternative, a graphic other than an "X" indicating that an image has been taken.

Screen display 1608 of FIG. 16H is similar to the screen display 1601 of FIG. 16B except that one of the image status indicators 1610 is marked with an "X." As shown, the countdown is starting once again for a second image to be taken. The second image imaging sequence may be substantially similar to the imaging sequence as shown in FIGS. 16B-G. As such, for simplicity, further description on the details of the second image imaging sequence shall not be provided.

Figure 16I:
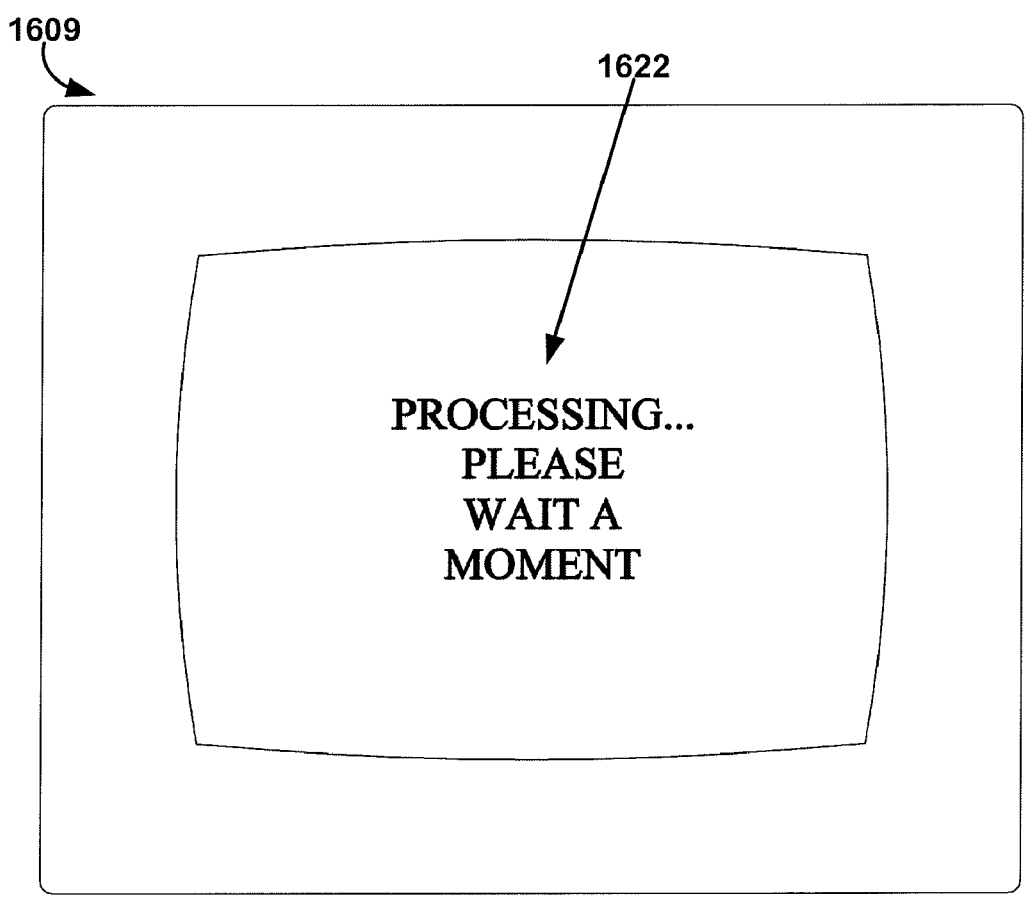

When the imaging sequences are finished (e.g., three imaging sequences), the screen display 1609 may show a processing instruction 1622 as shown in FIG. 16I. Other instructions may be provided on screen display 1609 to instruct the users to, e.g., wait for the photo strip to print, leave the booth, imaging status, reprint order confirmation, etc.

After the one or more images are taken, the one or more images may be stored (block 420) by the computing apparatus of the photo booth. The one or more images may be stored in the computing apparatus temporarily (e.g., until the images are printed) or longer (e.g., until the images can be uploaded to a website). Further one or more of the images may be modified (e.g., with text and/or speech bubble, etc.) in the same manner by the computing apparatus as described herein.

As described herein, when an object (e.g., an image, an answer, or an alphanumeric string) is "stored," the object may be stored using the computing apparatus within a data storage device.

The computing apparatus may then send the one or more images to the printing apparatus to print a photo strip including at least one image of the one or more images (block 432). Exemplary photo strips are described herein with reference to FIGS. 18A and 20.

Figure 8:
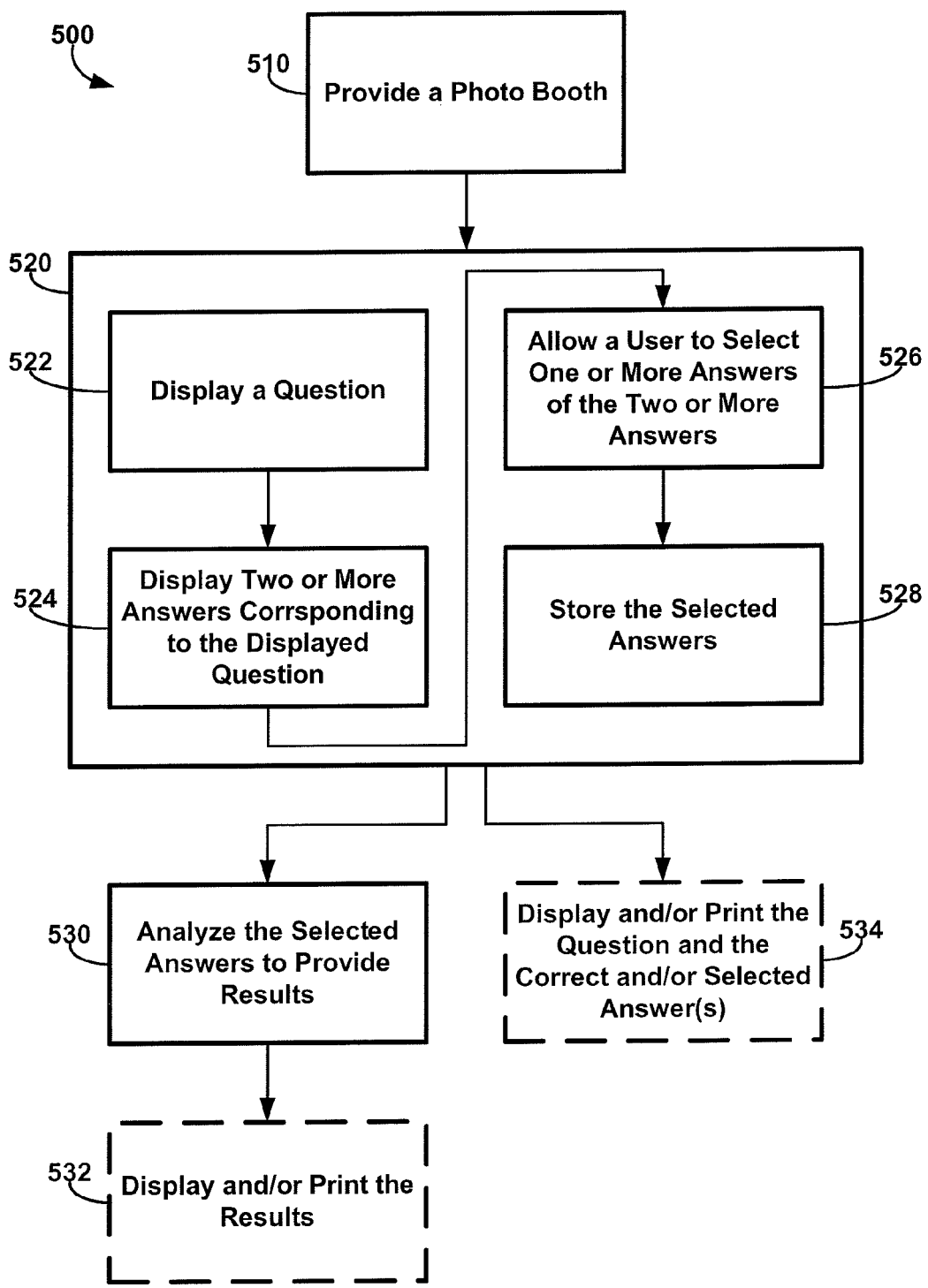
FIG. 8 is a detailed block diagram of another exemplary method of using a photo booth according to the present invention as generally illustrated in the method of FIG. 6.

A detailed block diagram of another exemplary method 500 of using a photo booth according to the present invention is shown in FIG. 8. Generally, this method 500 executes a "quiz game" within the photo booth and analyzes the answers to, e.g., generate results of the "quiz game." The method 500 may include providing a photo booth 510. The photo booth provided in block 510 may be similar to the photo booth 202 described herein with reference to FIG. 2. As such, for simplicity, further description on the details of providing a photo booth shall not be provided.

Further, the method 500 may include interaction between the photo booth and one or more user groups (block 520). This interaction step (block 520) may include displaying a question (block 522), displaying two or more answers corresponding to the displayed question (block 524), allowing a user to select the one or more answers of the two or more answers (block 526), and storing the selected answers (block 528).

The questions displayed may be subjective questions (e.g., questions that may not have a correct answer) or objective questions (e.g., questions that may have one or more correct answers). An example of a subjective question may be the following: "Who is more likely to overdraw their checking account?" An example of an objective question may be the following: "Where did Jack and Jill Meet?"

The questions may be questions associated to an event at which the photo booth is being used. For example, the questions may be about the bride and groom of a wedding, the history of a company, etc.

Although the method 500 is described as only displaying one question and two or more answers corresponding to the displayed question, the methods described herein may ask multiple questions with corresponding answers together or on the same display in succession, between photos, before photos, and/or after photos. Further, at least in one embodiment, each group of the one or more user group may get one question drawn at random from a finite number of questions.

At least in one embodiment, the questions and answers may be provided in event specific configuration information that may be provided by the methods and/or systems described herein. Further, at least in another embodiment, the questions and answers may be input by an administrator before an event.

Figure 17A:
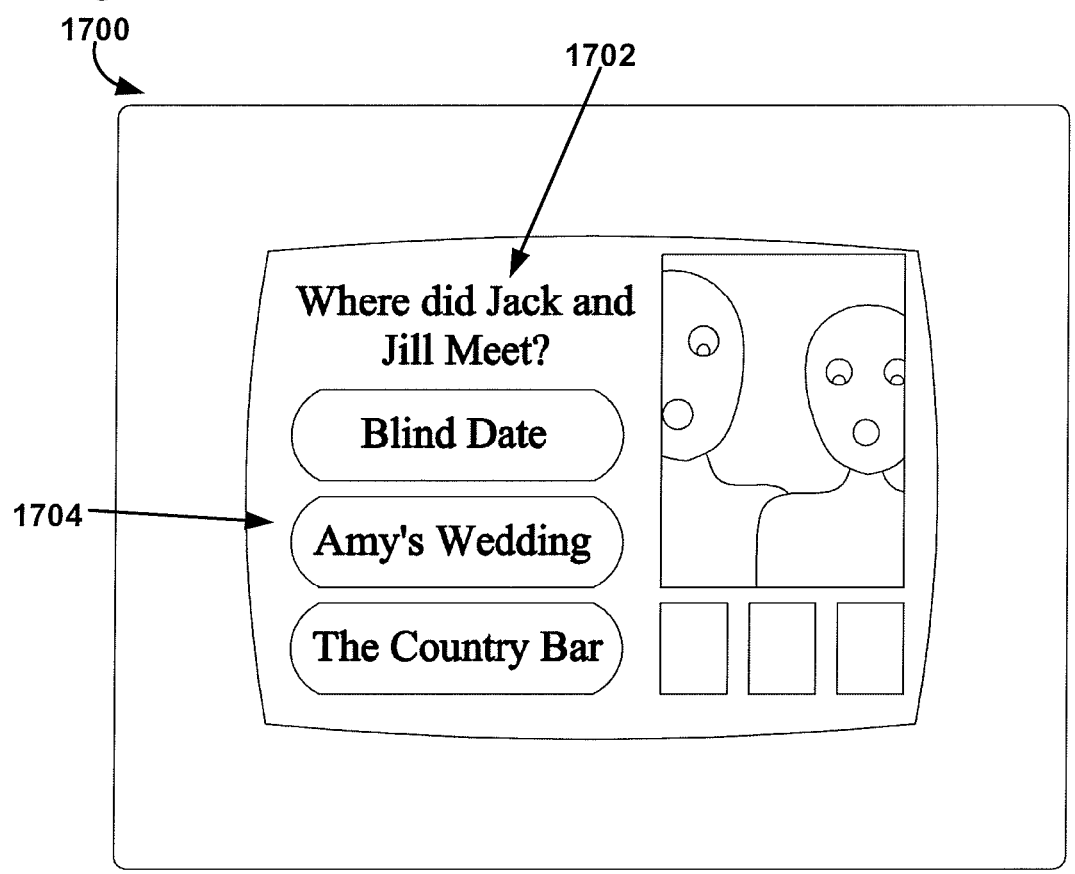

One or more exemplary embodiments of the steps of displaying a question (block 522) and displaying two or more answers (block 524) may be shown on the touch screen display 1700 of FIG. 17A. The touch screen display 1700 shows a question 1702 (i.e., "Where did Jack and Jill Meet?") and three answers 1704 (i.e., "Blind Date," "Amy's Wedding," or "The Country Bar"). The photo booth may allow a user to select one or more answers of the two or more answers (block 526) by allowing a user to touch the touch screen buttons surrounding the answers 1704.

Figure 17B:
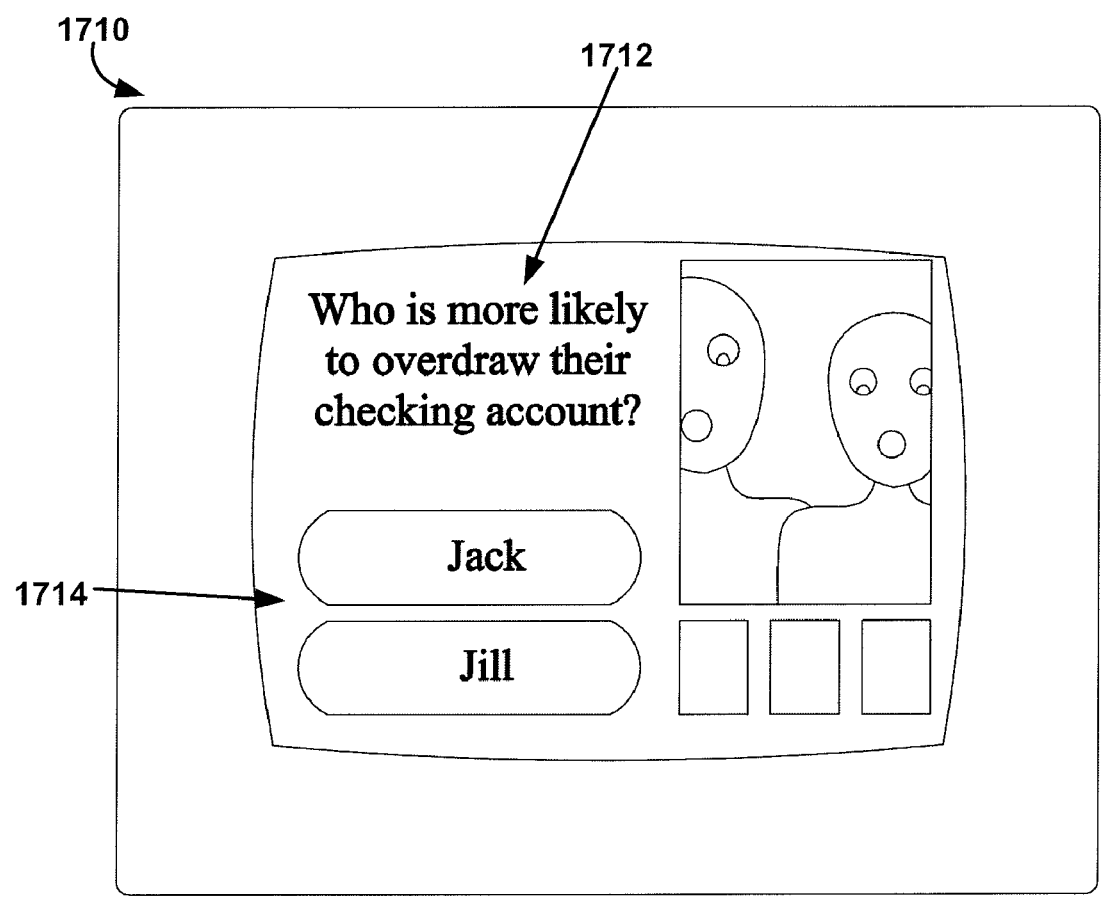

Another exemplary embodiment of the steps of displaying a question (block 522) and displaying two or more answers (block 524) may be shown on the touch screen display 1710 of FIG. 17B. The touch screen display 1710 includes a question 1712 (i.e., "Who is more likely to overdraw their checking account?") and two answers 1714 (i.e., "Jack," or "Jill"). The photo booth may allow a user to select one or more answers of the two or more answers (block 526) by allowing a user to touch the touch screen buttons surrounding the answers 1714.

Once a user group selects an answer (e.g., "Jill" from FIG. 17B), the computing apparatus of the photo booth may store the selected answer (block 528). The method 500 may optionally display and/or print the question and the correct and/or selected answer(s) (block 534) with the display and/or printing apparatus, respectively.

One or more exemplary embodiments of the question and correct answer being displayed (block 534) may be shown on the touch screen display 1720 of FIG. 17C. Touch screen display 1720 of FIG. 17C is similar to the screen display depicted in FIG. 16I, which is displayed after a user group has finished an imaging sequence. However, the screen display 1720 of the FIG. 17C shows the question along with the selected answer 1732. In other embodiments, instead of showing the selected answer, the screen display may show the correct answer to the corresponding question so that the user group is informed of the correct answer before they leave the photo booth. In other embodiments, partial results may be displayed on the display instead of the question and answer such as, "64% of user groups so far have answered The Country Bar, which is INCORRECT!!!" or "64% answered The Country Bar, 25% answered Blind Date, 11% answered Amy's Wedding. The Correct Answer is Blind Date." Alternatively, the partial results may include a listing of the answers with thumbnail pictures (e.g., images from the imaging sequence) of the users who gave a particular answer to the question.

Further, one or more exemplary embodiments of the question and selected answer being printed (block 534) may be shown on the photo strip 1800 of FIG. 18A. The photo strip 1800 may include two sets of images 1802, the question and selected answer 1804, a logo 1806, and an event password 1808. In other embodiments, instead of printing the selected answer, the correct answer to the corresponding question may be printed so that the user group is informed of the correct answer upon reading the photo strip.

The selected answers may be analyzed with computing apparatus to provide results (block 530). At least in one embodiment, the selected answers may be analyzed after each user group has completed an imaging sequence or has completed answering each question. At least in another embodiment, the selected answers may be analyzed after the event is over. The analysis of the answers provides results that may be optionally displayed and/or printed (block 532) with the display and/or printing apparatus, respectively.

The analysis may include calculating the percentage of user groups that selected each particular answer. In other embodiments, the analysis may include generating graphical depictions of the results (e.g., charts and/or graphs).

One or more exemplary embodiments of the results being printed (block 532) are shown on the event report card 1850 of FIG. 18B. Generally, the even report card 1850 may be printed towards the end of an event so that an announcer (e.g., a disc jockey) may report the results to the people attending the event. For example, the event report card 1850 reports that when asked "Where did Jack and Jill Meet?" 64% of the user groups selected "The Country Bar," 11% of the user groups selected "Amy's Wedding," and 25% of the user groups correctly selected "Blind Date." As shown, the event report card 1850 may include a graphical representation of the results (e.g., a pie graph). The event report card 1850 may further include thumbnail pictures of users who selected particular answers.

In other embodiments, the results may be displayed on the display of the photo booth or an exterior display device of a photo booth system. For example, an exterior display device may show questions and their corresponding answers including the percentages of user groups that have selected each answer.

At least in one embodiment, instead of selecting an answer from two or more displayed answers, the photo booth may provide a method by which a user group may input with the input apparatus (e.g., a keyboard or keyboard displayed on the touch screen) a specific alphanumeric answer to the question. For example, when asked "Where did Jack and Jill Meet?" the user group may opt to "write in" their own answer using a touch screen keyboard (e.g., the user group may enter "In a Brothel"). Such specific alphanumeric answers (e.g., with thumbnail images of the users who answered them) may be printed on an event report card (e.g., event report card 1850 of FIG. 18B) and/or analysis may be performed on the answers.

Figure 9:
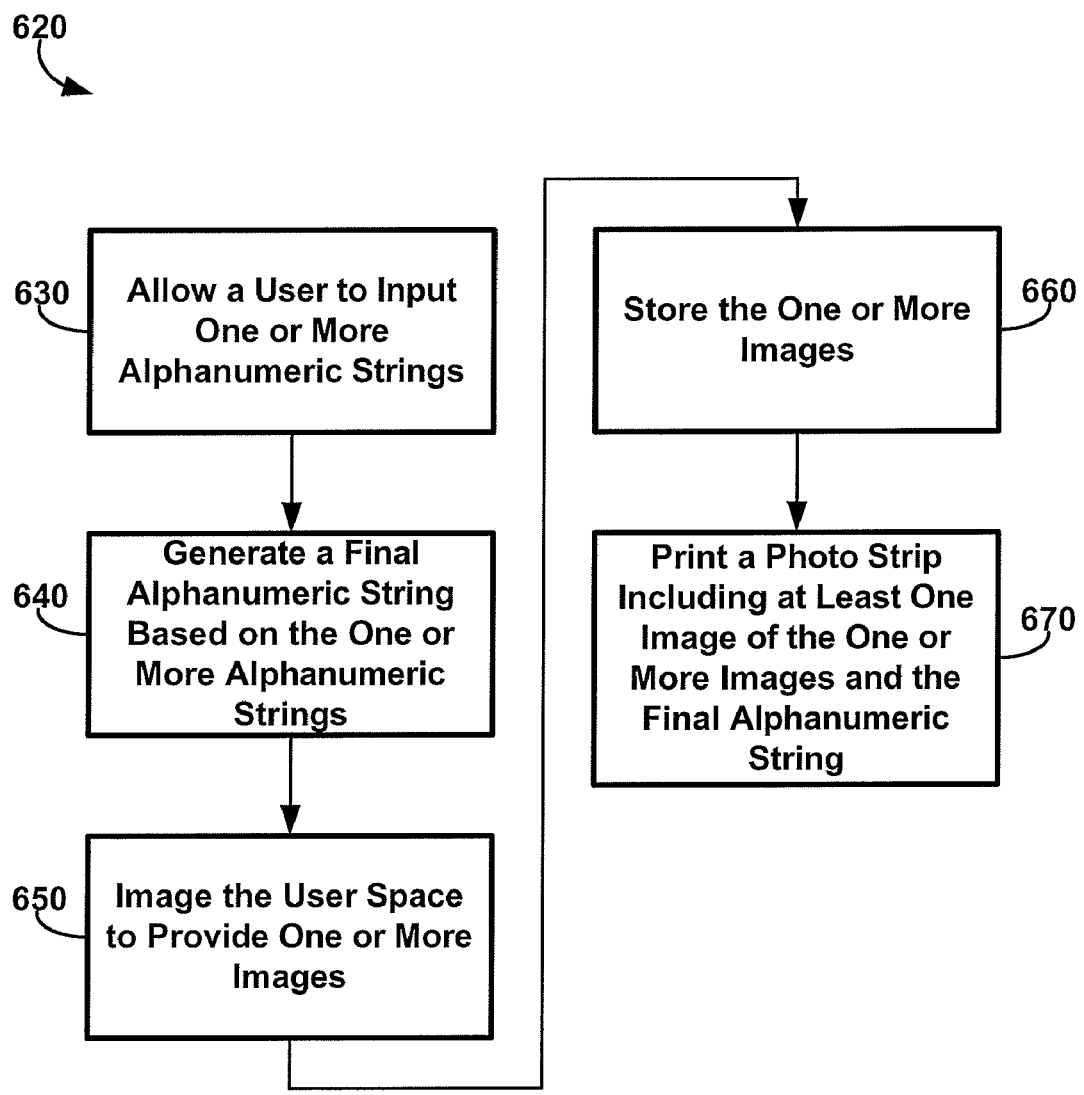
FIG. 9 is a detailed block diagram of another exemplary method of interacting between a photo booth and one or more users groups as generally illustrated in the method of FIG. 6.

A detailed block diagram of another exemplary method 620 of interacting between a photo booth and one or more users groups is shown in FIG. 9. This method 620 allows a user group to provide an alphanumeric message on their photo strip. The alphanumeric message may be picked entirely by the user group or, in the alternative, the user group may select a few alphanumeric strings (e.g., words) and the computing apparatus may generate the final alphanumeric string (e.g., a phrase) based on the selected alphanumeric strings. Further, this process may be customized by an administrator to include personalize alphanumeric strings (e.g., names, places, events, favorite things, and/or inside jokes).

The method 620 may include allowing a user to input one or more alphanumeric strings (block 630). The user may input one or more alphanumeric strings using input apparatus of the photo booth such as, e.g., a keyboard or a touch screen. Further, in other embodiments, a list of words (e.g., 50 or more words) may be displayed on the display and a user may select one or more words using the input apparatus.

After the user has input one or more alphanumeric strings (block 630), the method 620 may generate a final alphanumeric string based on the one or more alphanumeric stings (block 640) using the computing apparatus. At least in one embodiment, generating the final alphanumeric string (block 640) may include transforming the alphanumeric string into a graphical representation that may be printed on the photo strip (e.g., on or beside at least one of the images of the photo strip). For example, the computing apparatus may generate "balloon" letters from the inputted one or more alphanumeric string.

In other embodiments, the computing apparatus may generate additional alphanumeric strings that may be added to the inputted one or more alphanumeric strings. For example, the user group may enter "Having a fun time" and the computing apparatus may add "at the Wiegratz Bar Mitzvah!" to generate the final alphanumeric string of "Having a fun time at the Wiegratz Bar Mitzvah!"

The method 620 may further include imaging the user space to provide one or more images (block 650), storing the one or more images (block 660), and printing a photo strip including at least one image of the one or more images and the final alphanumeric string (block 670).

Figure 10:
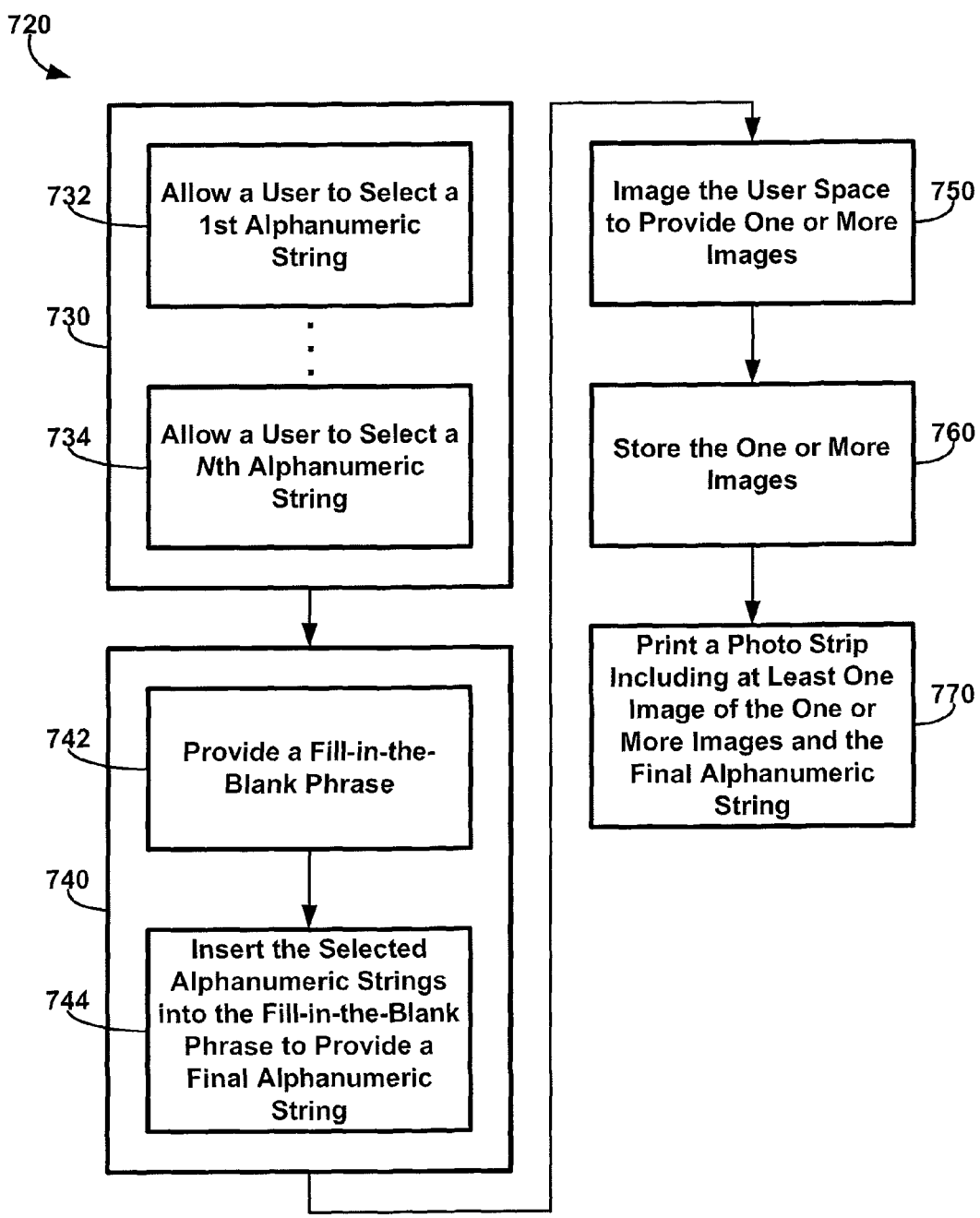
FIG. 10 is a detailed block diagram of another exemplary method of interacting between a photo booth and one or more users groups as generally illustrated in the method of FIG. 6.

A detailed block diagram of another exemplary method 720 of interacting between a photo booth and one or more users groups is shown in FIG. 10. The method 720 may include allowing a user to input one or more alphanumeric strings (block 730) and generating a final alphanumeric string based on the one or more alphanumeric strings (block 740).

Allowing a user to input one or more alphanumeric strings (block 720) may include allowing a user to select a first alphanumeric string (block 732) provided by the computing apparatus and allowing a user to select an Nth alphanumeric string (block 734) provided by the computing apparatus. The ellipsis between the blocks 732 and 734 signifies that the method may include two or more alphanumeric string selection steps, which may be pre-determined by an administrator configuring the photo booth.

One or more exemplary embodiments of the steps of allowing a user to input one or more alphanumeric strings (block 730) may be shown on the touch screens of FIG. 19A-E. The touch screen display 1910 displays the instructions "Select a Noun" and four nouns 1912, namely "The Smiths," "The Johnsons," "I," and "We." The photo booth may allow a user group to select one of the four nouns by touching the touch screen button corresponding to the noun (e.g., "We").

The touch screens 1910, 1920, 1930, 1940, and 1950 may further include a preview image 1902 of the user space to be imaged, a blank speech bubble 1904, and a speech bubble location manipulator 1906. The blank speech bubble 1904 may be a semi-opaque or opaque graphic of a speech bubble overlaying the preview image. The final alphanumeric string that is generated using the methods described herein may be printed within the speech bubble when the images are printed on a photo strip. Further, in at least one embodiment, one or more of the selected alphanumeric strings or the final alphanumeric string, once created, may appear in the speech bubble 1904 within the preview image 1902. However, in the embodiment depicted in FIGS. 19A-E, the speech bubble 1904 is blank so that the user group may be surprised by the alphanumeric strings appearing within the speech bubbles upon receiving the photo strip.

The speech bubble location manipulator 1906 may consist of three touch screen buttons that include graphical representations of different locations of the speech bubble within the preview image. A user may touch the touch screen buttons of the speech bubble location manipulator 1906 to move the speech bubble around within the preview image (and subsequently, within the images printed on the photo strip). In other embodiments, a user may be able to use the touch screen display in different ways to manipulate the location of the speech bubble. For example, a user may touch the preview image (or the speech bubble within the preview image) to move the speech bubble around the preview image (e.g., the user may "touch" and "drag" the speech bubble). Further, for example, the touch screen display may have arrows that a user may touch to move the speech bubble around.

Also, in other embodiments, a user may use other input apparatus to manipulate the location of the speech bubble. For example, a user may press buttons on the photo booth to move the speech bubble. Further, for example, a user may use a trackball on the photo booth to move the speech bubble.

Figure 19A:
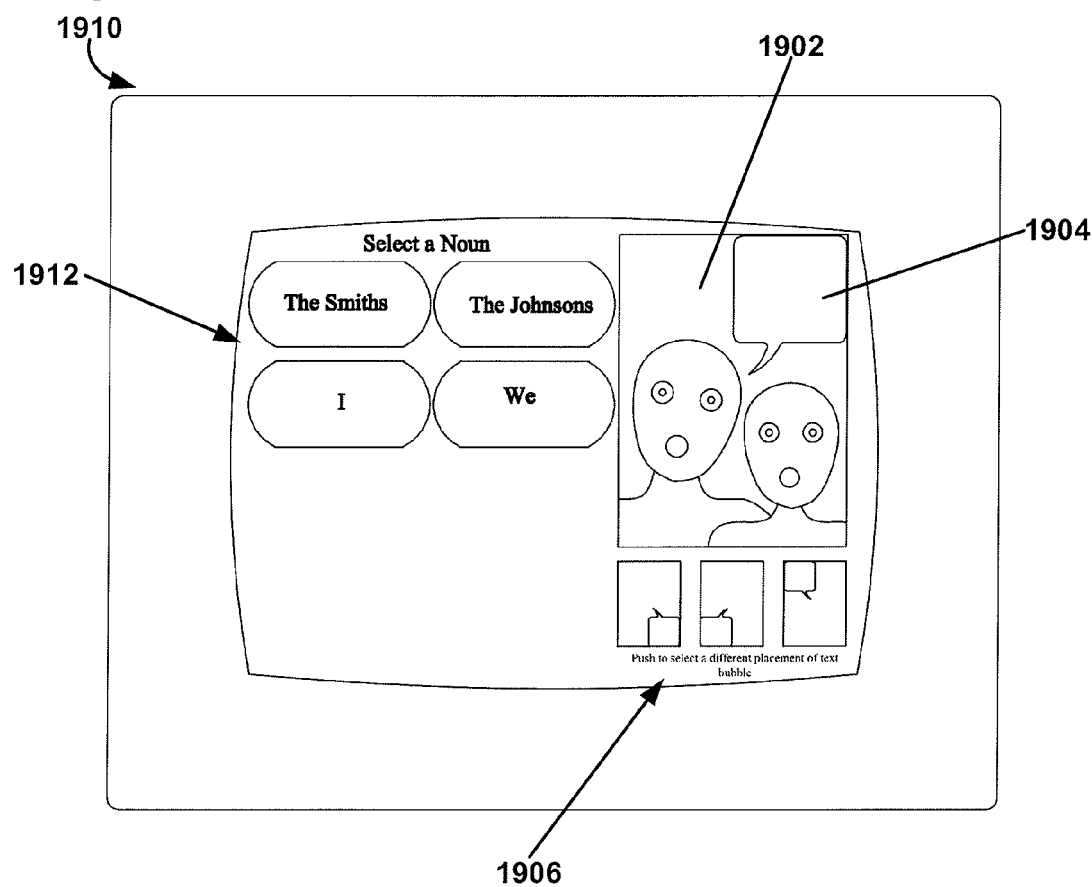
FIGS. 19A-F depict exemplary screen displays of a photo booth executing another method according to the present invention, e.g., the methods generally illustrated in FIGS. 9-10.
Figure 19B:
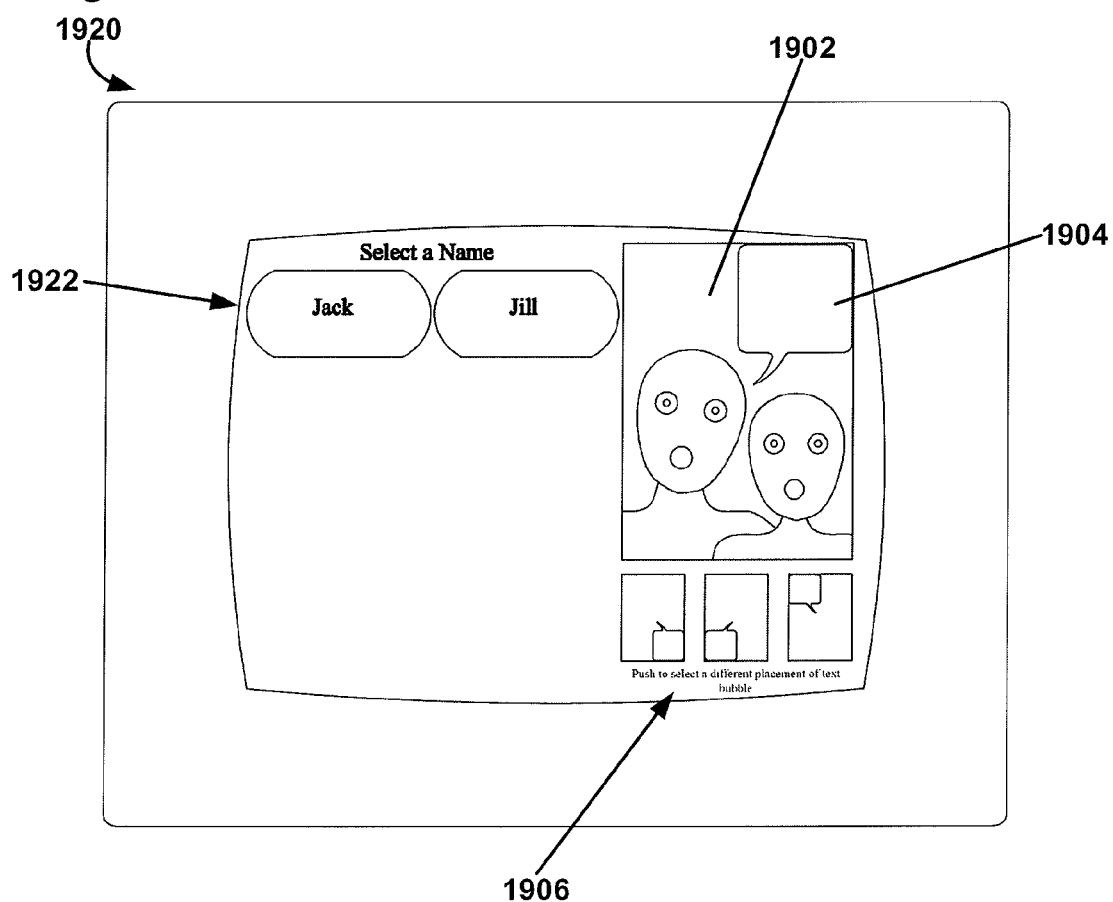

The touch screen display 1920 of FIG. 19B displays the instructions "Select a Name" and two names 1922, namely "Jack" and "Jill." The photo booth may allow a user group to select one of the two names by touching the touch screen button corresponding to a name (e.g., "Jack").

Figure 19C:
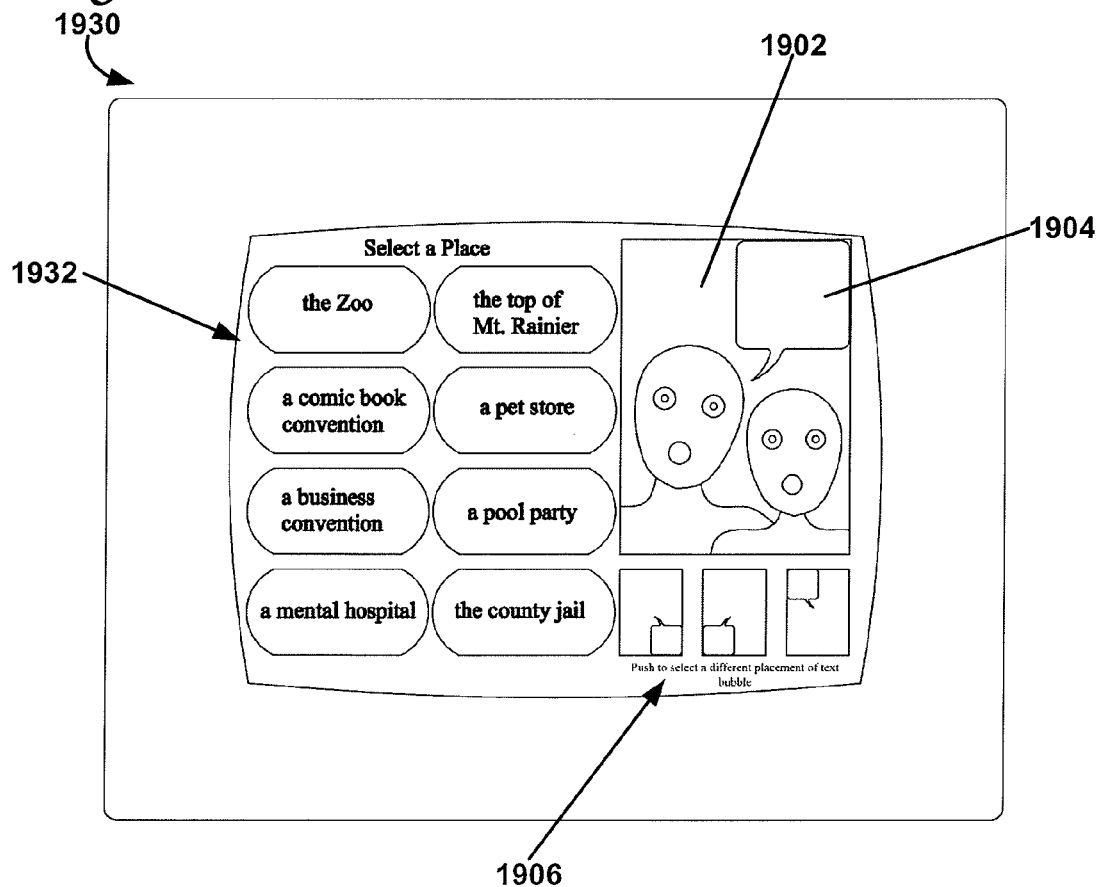

The touch screen display 1930 of FIG. 19C displays the instructions "Select a Place" and eight places 1932. The photo booth may allow a user group to select one of the eight places by touching the touch screen button corresponding to a place (e.g., "a mental hospital").

Figure 19D:
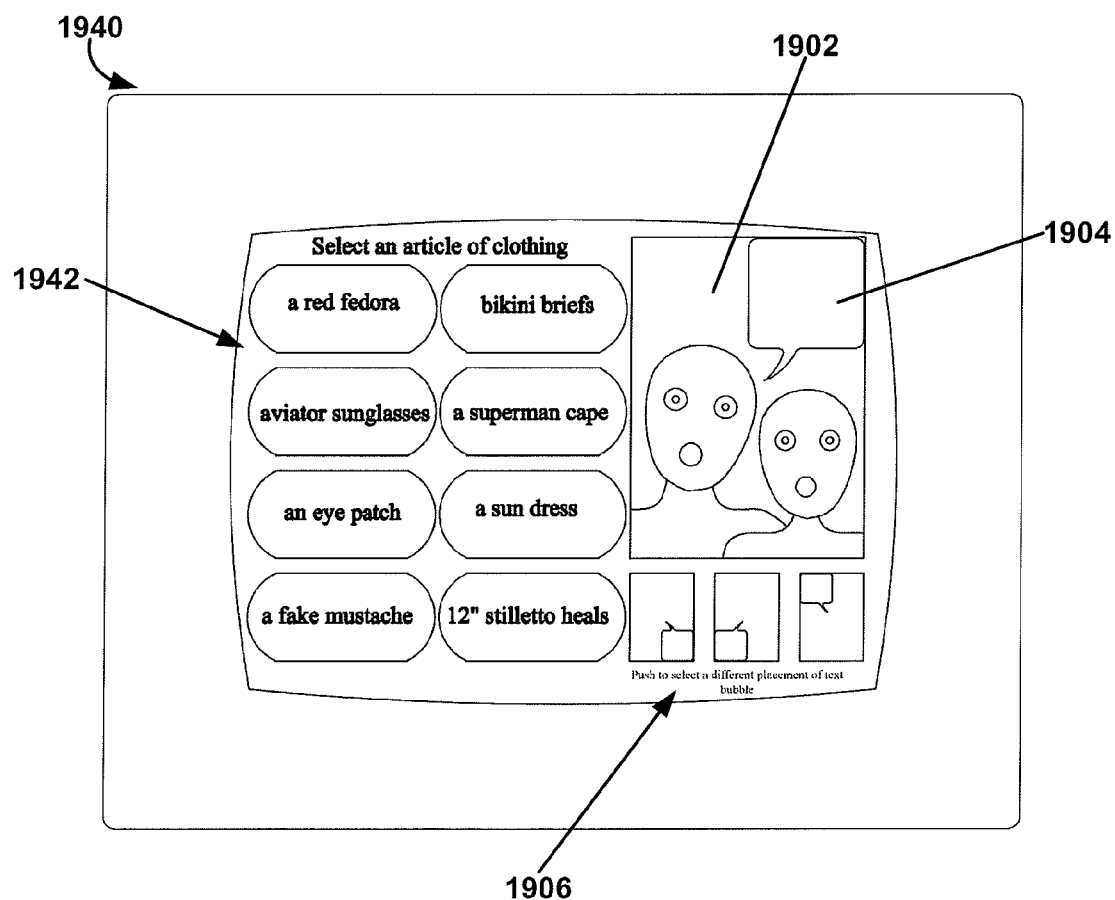

The touch screen display 1940 of FIG. 19D displays the instructions "Select an article of clothing" and eight articles of clothing 1942. The photo booth may allow a user group to select one of the eight articles by touching the touch screen button corresponding to an article (e.g., "a sun dress").

Figure 19E:
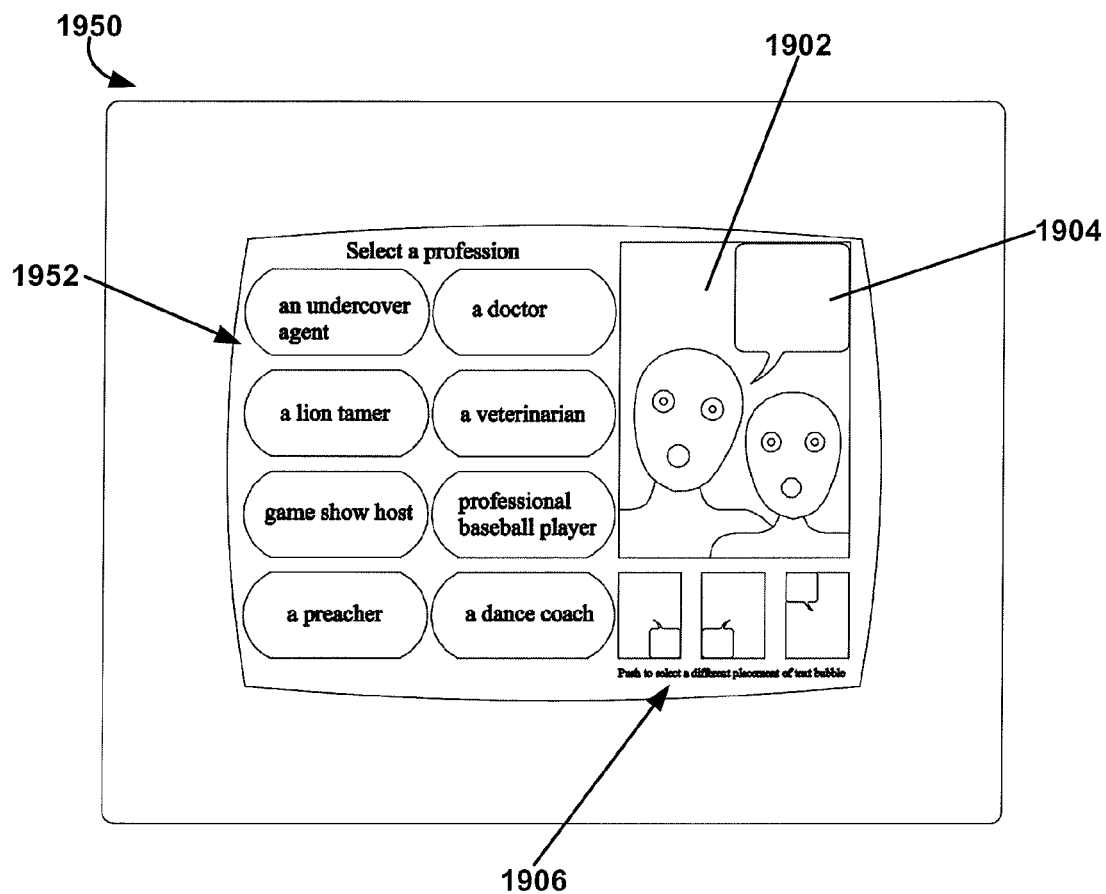

The touch screen display 1950 of FIG. 19E shows the instructions "Select a Profession" and eight professions 1952. The photo booth may allow a user group to select one of the two professions by touching the touch screen button corresponding to a profession (e.g., "a dance coach").

Figure 19F:
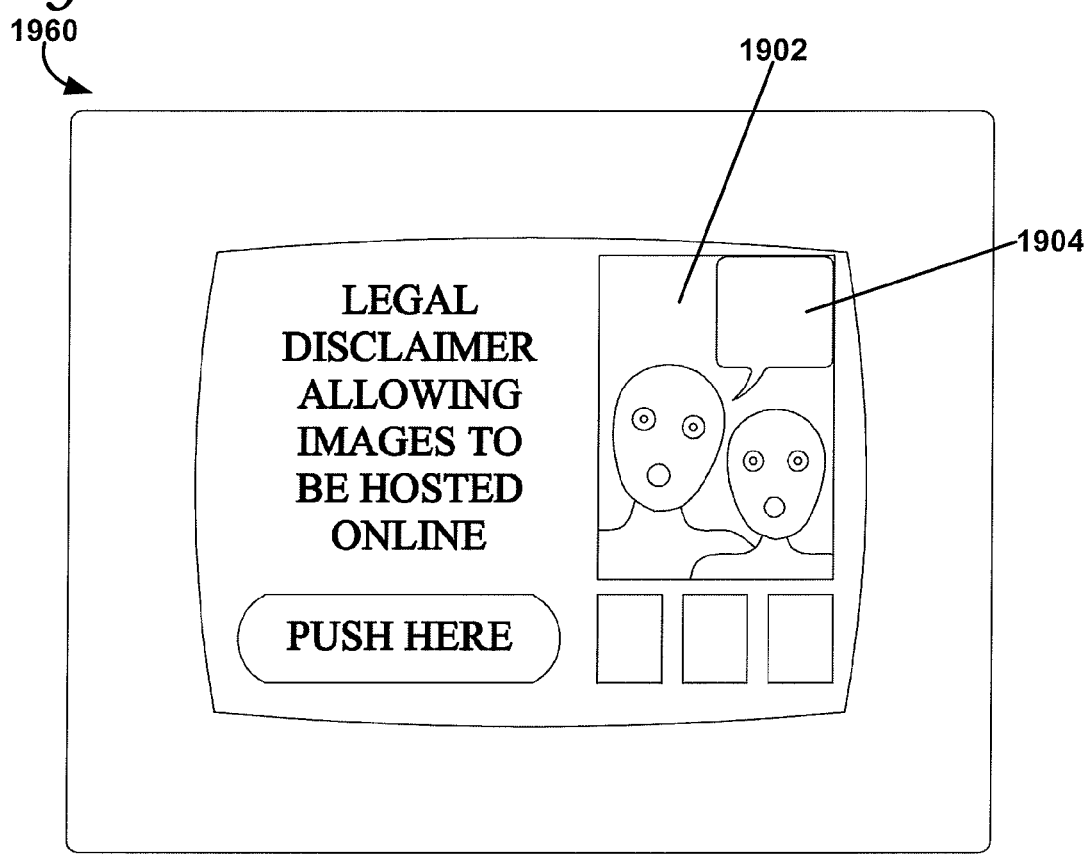

When the word selection sequence is complete, screen display 1960 of FIG. 19F may be shown, which may be the start of an imaging sequence, e.g., as described herein with reference to FIGS. 16A-I. As such, screen display 1960 may be substantially similar to screen display 1600 of FIG. 16A except screen display 1960 may include a preview image 1902 that has a speech bubble 1904. The speech bubble 1904 may remain in the preview image shown throughout the imaging sequence so that users of a user group may position their bodies and/or heads around the speech bubble.

Further, the method 720 may include generating a final alphanumeric string based on the one or more alphanumeric strings (block 740). Generating the final alphanumeric string based on the one or more alphanumeric strings (block 740) may include providing a fill-in-the-blank phrase (block 742) (e.g., "_____ ate _____ ate at _____ the while he was _____") and inserting the selected alphanumeric strings into the fill-in-the blank phrase to provide a final alphanumeric string (block 744) (e.g., Jacob ate brussel sprouts at the museum while he was laughing out loud.

The computing apparatus may include a plurality of pre-determined fill-in-the-blank phrases from which it may choose to use to generate the final alphanumeric string based on the one or more alphanumeric strings chosen by the user. In other embodiments, the display may show a list of fill-in-the-blank phrases from which a user may choose before, after, or while selecting the one or more alphanumeric strings.

In the exemplary embodiment shown on the touch screens of FIG. 19A-E, the final alphanumeric string that may be generated may be "We met Jack in a mental hospital. He was wearing a sun dress and he claimed that he was a dance coach."

After generating the final alphanumeric string based on the one or more alphanumeric strings (block 740), the method 720 may continue to image the user space to provide one or more images (block 750), store the one or more images (block 760), and print a photo strip including at least one image of the one or more images and the final alphanumeric string (block 770).

An exemplary photo strip 2000 generated by photo booth systems and/or methods, e.g., the methods generally illustrated in FIGS. 9-10 and the screen displays of FIGS. 19A-F, is depicted in FIG. 20. Photo strip 2000 may include two sets of three images 2002. Each image may include a speech bubble 2004 located in the same area of the image. The speech bubbles 2004 may include the final alphanumeric string "We met Jack in a mental hospital. He was wearing a sun dress and he claimed that he was a dance coach." In this embodiment, the final alphanumeric phrase is split among the three images. In other embodiments, each image may have the same or a unique final alphanumeric string.

Further, photo strip 2000 defines a gutter 2005 between each set of images. Text and/or graphics may be printed within the gutter 2005. The gutter 2005 of the photo strip 2000 as shown in FIG. 20 includes a logo 2006 and an event password 2008. Although not depicted, the gutter 2005 may contain a perforation extending the length of the gutter such that at least one of the two sets of images may be removed from the photo strip. The logo 2006 may be a logo of a company, a brand, alphanumeric strings, images, results, notifications, and/or a fortune. The event password 2008 may be a unique alphanumeric string generated by the computing apparatus of the photo booth that may be used by users to access a website that, e.g., includes the images from a specific event.

Figure 11:
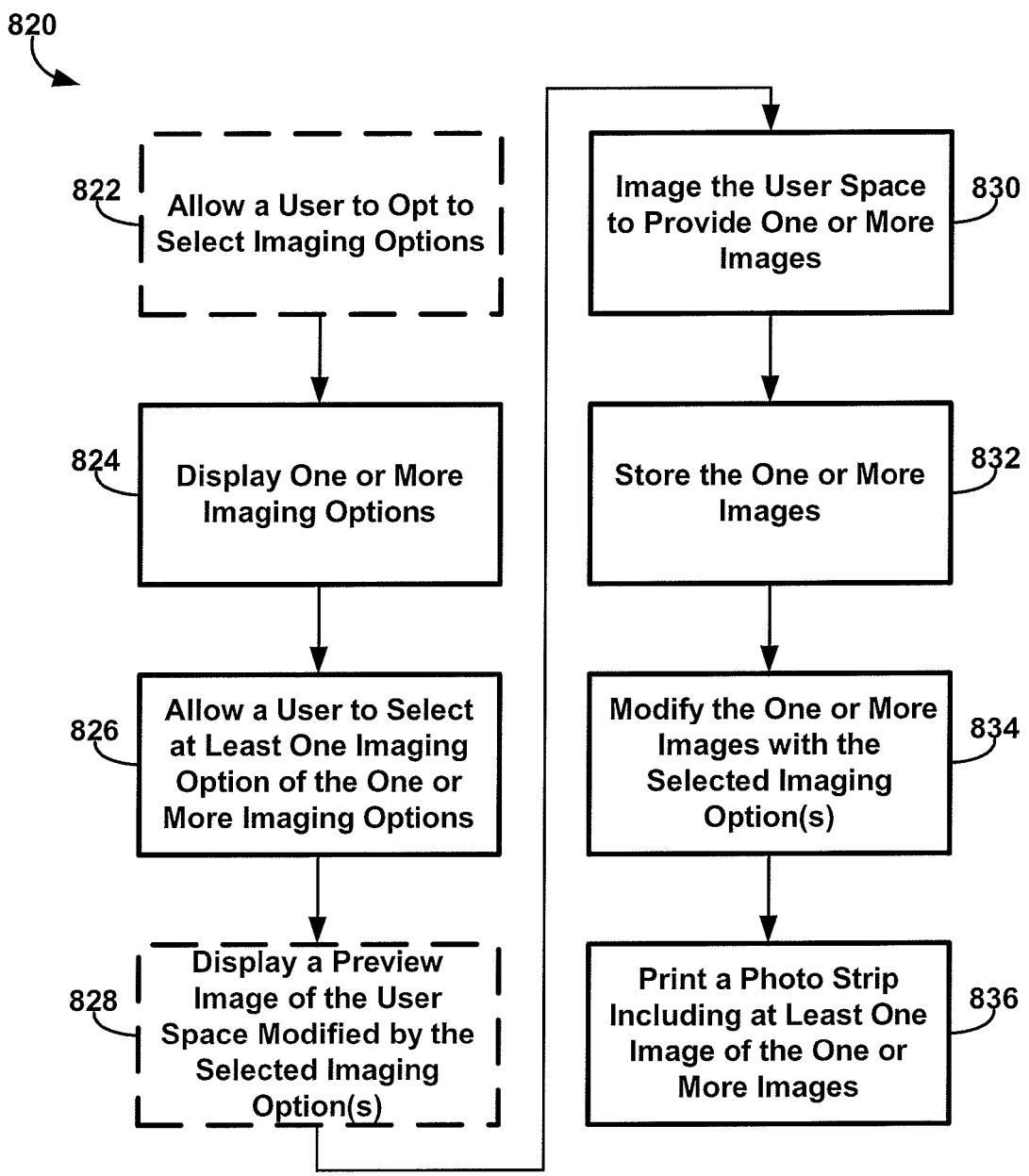
FIG. 11 is a detailed block diagram of another exemplary method of interacting between a photo booth and one or more users groups as generally illustrated in the method of FIG. 6.

A detailed block diagram of another exemplary method 820 of interacting between a photo booth and one or more users groups is shown in FIG. 11. Generally, method 820 provides imaging options to a user group so that the user group may customize their images and/or photo strip. The method 820 may optionally begin by allowing a user to opt to select imaging options (block 822).

Figure 21A:
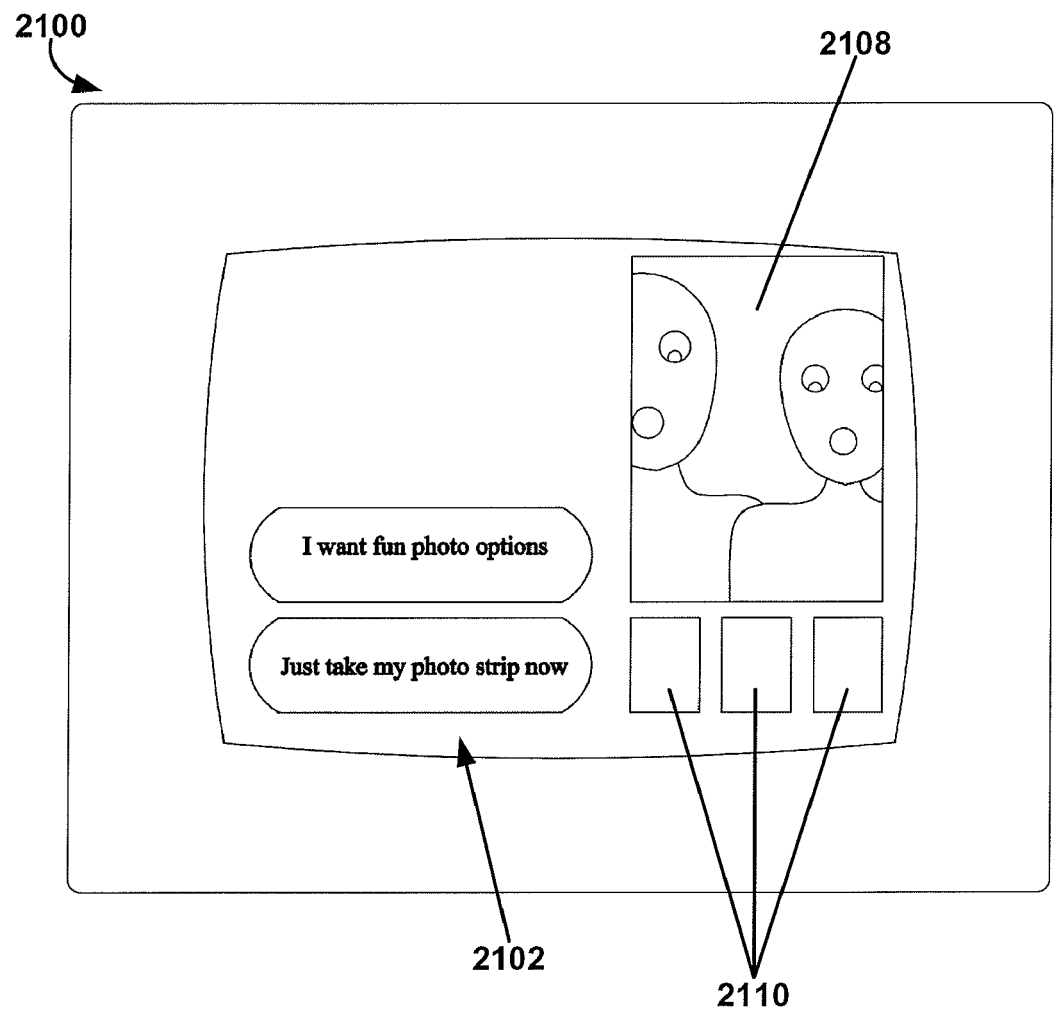

One or more exemplary embodiments of the step of allowing a user to opt to select imaging options (block 822) may be shown on the touch screen display 2100 of FIG. 21A. The touch screen display 2100 displays two options 2102: "I want fun photo options" or "Just take my photo strip now," a preview image 2108, and image status indicators 2110. A user may touch one of the two options 2102 to proceed to either the imaging options or to an imaging sequence.

If a user opts to select imaging options (block 822), one or more imaging options may be displayed on the display (block 824) and a user may select at least one imaging option of the one or more imaging options (block 826). An exemplary embodiment of the step of displaying one or more imaging options (block 824) may be shown on the touch screen display 2150 of FIG. 21B. The touch screen display 2150 shows a preview image 2108, six imaging options 2152, and an imaging sequence start button 2154. The six imaging options 2152 may include tone options, layout options, background options, foreground options, distortion options, and cutout options. Other options may include reprint options (e.g., a user may be able to reprint photo strips and/or images that have already been printed).

Tone options may include options that modify the color tone of the images to be taken. For example, tone options may include black-and-white, sepia, color, inverted color, saturation levels, cross-processing, different color balances, different density and color levels, etc.

Layout options may include options that may change the layout of the photo strip. For example, layout options may include selecting number of images per strip, size of images on strip, arrangement of photo strip, duplication of images (e.g., two strips of three or one strip of six), etc.

Background options may include false backgrounds to insert behind the images of the user space. For example, a false background may be an image of the mountains, a beach, an underwater scene, a logo, people, a color, animals, a jungle, etc.

Foreground options may include false foregrounds to insert over the images of the user space. For example, a false foreground may be an image of prison bars, a border, people, animals, etc.

Distortion options may include distortion effects that distort the image of the user space. For example, the distortion effects may include blur, noise, sharpen, unsharpen, pixelize, mosaic, lens effects, lighting effects, vignetting, cross-processing, aging effects, skews, pinches/pulls, enlarging/reducing, etc.

Cutout options may include foreground objects to insert over the images of the user space. For example, foreground objects may include a hat, a mustache a mohawk, eyes, a nose, ears, bunny ears, a heart, a speech bubble, an entire body with an open face area, etc.

The method 820 may optionally include displaying a preview image of the user space modified by the selected imaging option(s) (block 828). For, example, when an imaging option is selected (block 826), the preview image 2108 may apply the imaging option to allow the user group a preview of what was selected. For example, if a user group selects a distortion option such as blur, the preview image of the user space may become blurred.

If the user group decides that they do not want a particular imaging option they selected, they may unselect it. When the user group is done selecting imaging options, the user group may touch the touch screen button 2154 (i.e., "Just take my photo strip now) to proceed to the imaging sequence. At least in one embodiment, the imaging options screen 2150 may include a timer that counts down the amount of time a user group may have to select one or more imaging options. After the timer runs out, the imaging sequence (e.g., as shown in FIGS. 16A-I) may automatically begin.

Further, the method 820 may include imaging the user space to provide one or more images (block 830), storing the one or more images (block 832), modifying the one or more images with the selected imaging option(s) (block 834), and printing a photo strip including at least one image (i.e., image(s) modified by the imaging options) of the one or more images (block 836).

A detailed block diagram of another exemplary method 900 of using a photo booth is illustrated in FIG. 12. The method 900 may include providing a photo booth (block 910) and providing one or more exterior display devices (block 915). The one or more exterior display devices (block 915) may be substantially similar to the exterior display devices 256 described herein with reference to FIG. 4. As such, for simplicity, further description on the details of the exterior display devices shall not be provided.

The method 900 further includes interacting between the photo booth and one or more user groups (block 920). Interacting between the photo booth and one or more user groups (block 920) may include imaging the user space to provide one or more images (block 922), storing the one or more images (block 924), transmitting at least one image of the one or more images to at least one exterior display device (block 926), and displaying the transmitted image on the at least one exterior display device (928).

Transmitting at least one image to an exterior display device (block 926) may include transmitting the image from the computing apparatus of the photo booth to the exterior display device. The transmission may utilize a wired or wireless connection using standard data (e.g., analog or digital) transmission protocols (e.g., ethernet, wireless ethernet, Bluetooth, etc.). At least in one embodiment, the transmission may merely be a video signal being transmitted over a cable, e.g., a s-video cable, a composite cable, a coaxial cable, a HDMI cable, a component cable, etc.

Upon receiving the image, the exterior display device may display the transmitted image (block 928) such that users outside of the photo booth may view the image. For example, the exterior display device may be a projector that projects the image onto a wall or a screen. Further, for example, the exterior display devices may be digital picture frames on every table of a wedding reception that receive images from the photo booth. Still further, for example, the exterior display device may be a website displayed on a computer screen. In this example, users anywhere in the world may login to a website and view the images within a web browser that are currently being taken within the photo booth.

Figure 13:
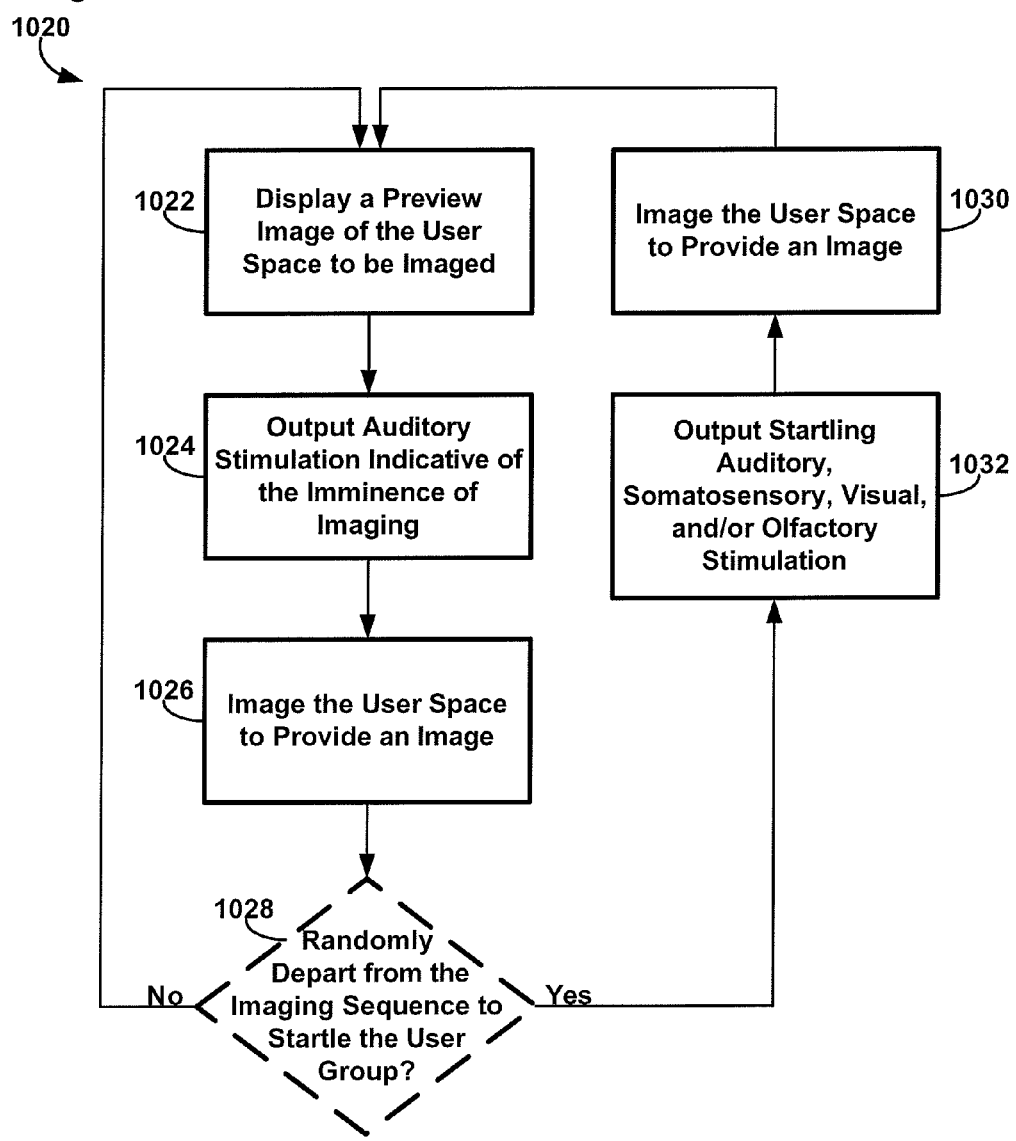
FIG. 13 is a detailed block diagram of another exemplary method of interacting between a photo booth and one or more users groups as generally illustrated in the method of FIG. 6.

A detailed block diagram of another exemplary method 1020 of interacting between a photo booth and one or more users groups is illustrated in FIG. 13. Generally, the method 1020 may provide a general standard imaging sequence (e.g., the imaging sequence set up to run during an event) and a startling imaging sequence. The startling imaging sequence may be designed such that the photo booth may startle the user group and simultaneously image the user space to provide images of the user group in a startled state.

The method 1020 may include displaying a preview image of the user space to be imaged (block 1022), outputting auditory stimulation indicative of the imminence of imaging (block 1024), and imaging the user space to provide an image (block 1026). Then, method 1020 may either restart the general standard imaging sequence or randomly depart from the imaging sequence to startle the user group (block 1028).

If the method 1020 randomly departs from the imaging sequence to startle the user group (block 1028), startling auditory, somatosensory, visual, and/or olfactory stimulation may be outputted by the photo booth (block 1032). For example, the visual output apparatus of the photo booth may flash bright colorful lights, the auditory output apparatus may output loud, obnoxious sounds, the somatosensory output apparatus may vibrate the bench of the photo booth, and/or the olfactory output apparatus may excrete a disgusting odor within the user space of the booth. Subsequently, the method 1020 may image the user space to provide an image (block 1030) of the user group in the startled state. In another example, the startling sequence may include the countdown time moving twice (or more) the normal speed of the countdown.

At least in one embodiment, the startling sequence may be executed at random. In other embodiments, the startling sequence may occur every second picture of the imaging sequence, may be triggered by an operator of the booth, and/or may be triggered by a user.

Figure 14:
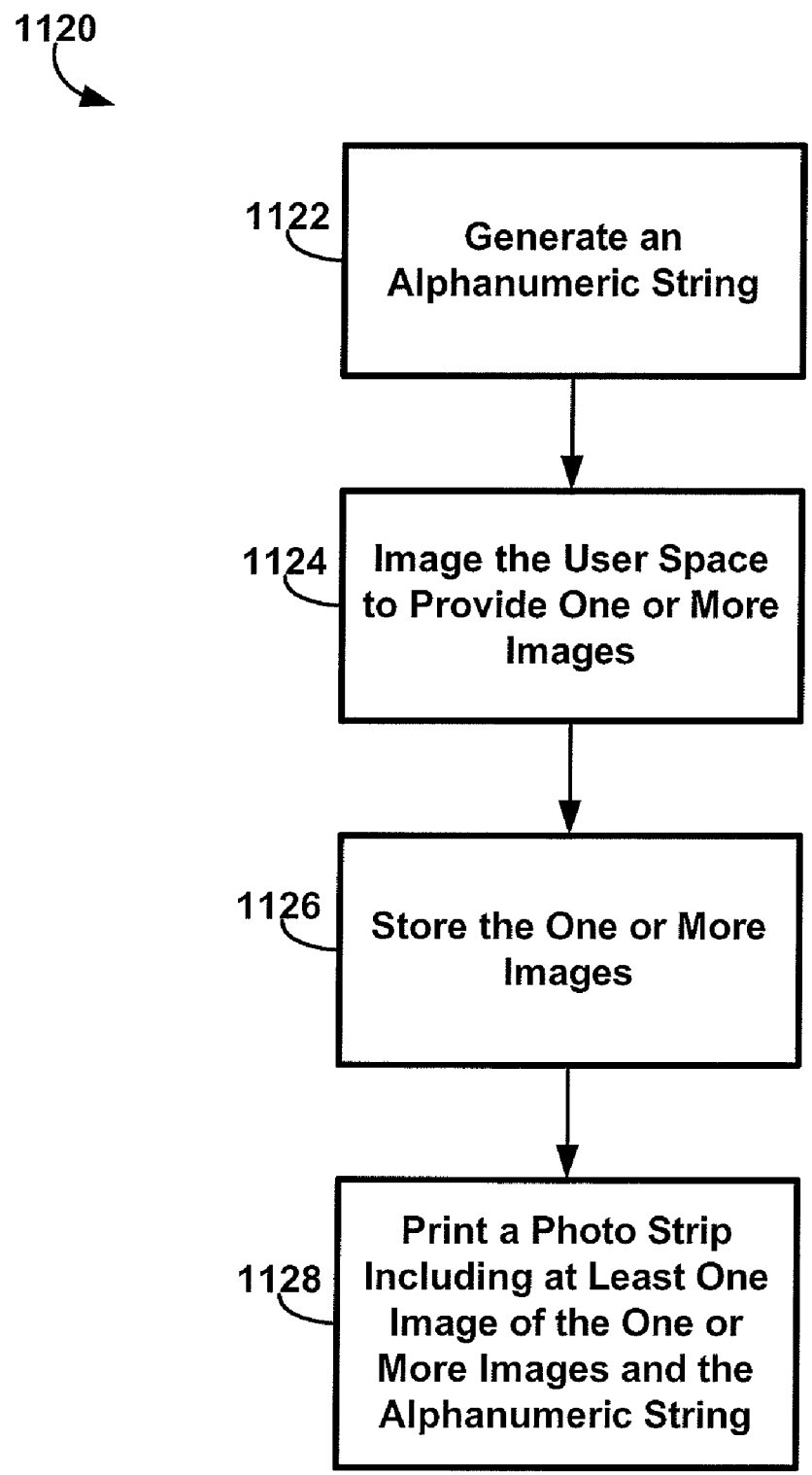
FIG. 14 is a detailed block diagram of another exemplary method of interacting between a photo booth and one or more users groups as generally illustrated in the method of FIG. 6.

A detailed block diagram of another exemplary method 1120 of interacting between a photo booth and one or more users groups is illustrated in FIG. 14. Generally, method 1120 generates an alphanumeric string, provides a basic imaging sequence, and prints a photo strip having the alphanumeric string and the one or more images. The method 1120 may include generating an alphanumeric string (block 1122) with the computing apparatus of the photo booth. Generating an alphanumeric string may include generating a unique alphanumeric string for each imaging sequence (e.g., a photo strip identifier), generating a unique alphanumeric string for each image of the imaging sequence (e.g., an image identifier), or generating a single alphanumeric string to be used for every imaging sequence of an event (e.g., an event password). The computing apparatus may include software routines and/or hardware to facilitate generation of the alphanumeric strings, or in the alternative, an administrator may input a plurality of alphanumeric strings to be used by the computing apparatus or may part of event specific configuration information provided by an administrator or a configuration medium.

Further, the method 1120 may include imaging the user space to provide one or more images (block 1124), storing the one or more images (block 1126), and printing a photo strip including at least one image of the one or more images and the alphanumeric string (block 1128). Printing the photo strip including the alphanumeric string (block 1128) may include printing more than one alphanumeric string (e.g., printing a unique image identifier next to each image). At least in one embodiment, the printed alphanumeric string may be a unique raffle number such that each photo strip serves as a raffle ticket for a raffle. Further, at least in another embodiment, the printed alphanumeric string may be a password for accessing a website that may, e.g., include the images from a particular event. Still further, at least in another embodiment, the printed alphanumeric string may be a unique identifier for the photo strip or for each image on the photo strip (i.e., a unique alphanumeric string proximate each image of the photo strip). Yet still further, at least in another embodiment, the printed alphanumeric string may be a fortune (e.g., like a fortune of a fortune cookie).

A general block diagram of another exemplary method 1200 of using a photo booth is illustrated in FIG. 15. Generally, the method 1200 allows an administrator to apply event specific configuration information to photo booth by using a configuration medium. For example, an administrator may deliver a photo booth to a wedding and the administrator may interface the configuration medium with the photo booth to configure the photo booth with an event specific configuration (e.g., wedding party name, imaging options, event specific quiz games questions and answers, event specific alphanumeric strings for speech bubbles, start/end times, number of "winners" for a lottery-type game, and/or any other event specific information).

The method 1200 may include providing a configuration medium with event specific information (block 1205) and providing a photo booth (block 1210). The configuration medium may be substantially similar to the configuration medium 236 of FIG. 3 and the photo booth may be substantially similar to the photo booth may be similar to the photo booth 202 of FIG. 2. As such, for simplicity, further description on the details of the configuration medium and photo booth shall not be provided.

The method 1200 may further include configuring the photo booth with the event specific configuration information (block 1215). Configuring the photo booth with the event specific configuration information (block 1215) may include interfacing the configuration medium with the photo booth, e.g., the computing apparatus of the photo booth, or the input apparatus of the photo booth, such that the event specific configuration information may be transmitted to the computing apparatus of the photo booth. Once the event specific configuration information is transmitted to the computing apparatus, the computing apparatus may configure the operation of the photo booth in accordance with event specific configuration information.

At least in one embodiment, an operator may merely insert a USB memory key (e.g., a configuration medium) into a USB port of the computing apparatus and the computing apparatus may automatically recognize the configuration medium, mount the file system of the configuration medium, download the event specific configuration information, and configure the photo booth according to the event specific configuration information.

Exemplary event specific configuration information may include photo strip layout, gutter layout, tone, one or more alphanumeric strings to be displayed on the display or printed on the photo strip, duration of operation for the photo booth, an audio message to be displayed on the display, a video message to be displayed on the display, information to be displayed, questions and/or answers for quiz game, etc.

For example, a video message (e.g., a greeting such as a bride and groom welcome message) may be shown on the display to each user group during the imaging sequence. Further, for example, the duration of operation may control how long the booth is operating at a particular event. If the duration of operation is set at three hours starting at 3:00 PM, the photo booth may cease operation at 6:00 PM. Still further, for example, the imaging options may configure the photo booth to modify the images to be black-and-white images with vignetting.

The method 1200 further includes interacting between the photo booth and the one or more use groups in accordance with the event specific configuration information (block 1215). This step (block 1215) may simply execute any of the methods described herein in accordance with the event specific configuration information. For example, the event specific configuration information may dictate that a quiz game method be executed within the photo booth (e.g., the configuration information may include event specific questions and answers) and that three black-and-white images are to be taken.

Further, the methods and/or systems described herein may allow users to reprint photo strips using the input apparatus of the photo booth. At least in one embodiment, the display of the photo booth may provide a screen display by which a user may find his/her images and/or photo strip and may reprint the images and/or photo strip using the printing apparatus. At least in another embodiment, the photo booth may include an exterior display device and input apparatus by which a user may find his/her images and/or photo strip and may reprint the photo strip using the printing apparatus. Further, in other embodiments, the user may also enter his/her email address such that the photo strip and/or images may be emailed to his/her email address.

The complete disclosure of the patents, patent documents, and publications cited in the Background, the Summary, the Detailed Description of Exemplary Embodiments, and elsewhere herein are incorporated by reference in their entirety as if each were individually incorporated. Exemplary embodiments of the present invention are described above. Those skilled in the art will recognize that many embodiments are possible within the scope of the invention. Other variations, modifications, and combinations of the various components and methods described herein can certainly be made and still fall within the scope of the invention. Thus, the invention is limited only by the following claims and equivalents thereto.

What is claimed is:

1. A method of using a photo booth, the method comprising:
   providing a photo booth, wherein the photo booth defines a user space, wherein the photo booth comprises:
      computing apparatus;
      printing apparatus operably coupled to the computing apparatus;
      imaging apparatus operably coupled to the computing apparatus, wherein the imaging apparatus is configured to image the user space;
      input apparatus operably coupled to the computing apparatus, wherein the input apparatus is configured to allow a user to input information into the computing apparatus; and
      output apparatus operably coupled to the computing apparatus, wherein the output apparatus is configured to present information to a user from the computing apparatus, wherein the output apparatus comprises a display;
   interacting between the photo booth and two or more user groups, wherein each user group of the two or more user groups comprises one or more users, wherein interacting between the photo booth and each user group of the two or more user groups comprises:
      displaying on the display a question from one or more questions provided by the computing apparatus to the user group;
      displaying on the display two or more answers from a plurality of answers provided by the computing apparatus to the user group, wherein the displayed two or more answers correspond to the displayed question;
      allowing the user group to select one or more of the two or more displayed answers using the input apparatus; and
      storing the one or more selected answers with the computing apparatus; and
   analyzing the selected answers stored using the computing apparatus to provide results, wherein the results are based on answers selected by at least two of the two or more users groups.

2. The method of claim 1, wherein the one or more questions comprise questions associated to an event at which the photo booth is being used.

3. The method of claim 1, wherein the method further comprises printing using the printing apparatus the results.

4. The method of claim 1, wherein interacting between the photo booth and each user group of the two or more user groups further comprises:
   imaging the user space with the imaging apparatus to provide one or more images;
   storing the one or more images with the computing apparatus; and
   printing using the printing apparatus a photo strip comprising at least one image of the one or more images.

5. The method of claim 4, wherein the photo strip further comprises at least a portion of the results of the analyzed one or more selected answers.

6. The method of claim 4, wherein interacting between the photo booth and each user group of the two or more user groups further comprises displaying on the display a preview image of the user space to be imaged by the imaging apparatus.

7. The method of claim 1, wherein interacting between the photo booth and each user group of the two or more user groups further comprises:
   displaying on the display at least a portion of the results of the analyzed selected answers.

8. The method of claim 1, wherein the method further comprises configuring the photo booth, wherein configuring the photo booth comprises:
   allowing an administrator to input the one or more questions into the computing apparatus; and
   allowing the administrator to input the plurality of answers into the computing apparatus.

9. The method of claim 1, wherein the input apparatus comprises a touch screen, and further wherein the display also comprises the touch screen.

10. The method of claim 1, wherein the booth comprises:
a bench inside of the user space;
at least three open sides; and
one or more curtains operable to cover the at least three open sides.

11. A method of using a photo booth, the method comprising:
providing a photo booth, wherein the photo booth defines a user space, wherein the photo booth comprises:
computing apparatus;
printing apparatus operably coupled to the computing apparatus;
imaging apparatus operably coupled to the computing apparatus, wherein the imaging apparatus is configured to image the user space;
input apparatus operably coupled to the computing apparatus, wherein the input apparatus is configured to allow a user to input information into the computing apparatus; and
output apparatus operably coupled to the computing apparatus, wherein the output apparatus is configured to present information to a user from the computing apparatus, wherein the output apparatus comprises a display;
interacting between the photo booth and two or more user groups, wherein each user group of the two or more user groups comprises one or more users, wherein interacting between the photo booth and each user group of the two or more user groups comprises:
displaying on the display a question from one or more questions provided by the computing apparatus to the user group;
allowing the user group to input an answer using the input apparatus;
storing the answer with the computing apparatus;
imaging the user space with the imaging apparatus to provide one or more images;
storing the one or more images with the computing apparatus; and
printing using the printing apparatus a photo strip comprising at least one image of the one or more images; and
printing using the printing apparatus the stored answers, wherein the stored answers comprise answers inputted by at least two of the two or more users groups.

12. The method of claim 11, wherein the input apparatus comprises a touch screen, wherein the display also comprises the touch screen; and wherein allowing the user group to input an answer using the input apparatus comprises:
displaying on the touch screen a keyboard provided by the computing apparatus; and
allowing the user group to use the keyboard displayed on the touch screen to input the answer.

13. The method of claim 11, wherein allowing the user group to input an answer using the input apparatus comprises:
displaying on the display two or more answers from a plurality of answers provided by the computing apparatus to the user group, wherein the displayed two or more answers correspond to the displayed question; and
allowing the user group to select one or more of the two or more displayed answers using the input apparatus.

14. A method of using a photo booth, the method comprising:
providing a photo booth, wherein the photo booth defines a user space, wherein the photo booth comprises:
computing apparatus;
printing apparatus operably coupled to the computing apparatus;
imaging apparatus operably coupled to the computing apparatus, wherein the imaging apparatus is configured to image the user space;
input apparatus operably coupled to the computing apparatus, wherein the input apparatus is configured to allow a user to input information into the computing apparatus; and
output apparatus operably coupled to the computing apparatus, wherein the output apparatus is configured to present information to a user from the computing apparatus, wherein the output apparatus comprises a display; and
interacting between the photo booth and one or more user groups, wherein each user group of the one or more user groups comprises one or more users, wherein interacting between the photo booth and each user group of the one or more user groups comprises:
allowing the user group to input one or more alphanumeric strings using the input apparatus into the computing apparatus, wherein allowing the user group to input one or more alphanumeric strings comprises:
displaying on the display a plurality of first alphanumeric strings provided by the computing apparatus;
allowing the user group to select a first alphanumeric string of the plurality of first alphanumeric strings;
displaying on the display a plurality of second alphanumeric strings provided by the computing apparatus; and
allowing the user group to select a second alphanumeric string of a plurality of second alphanumeric strings;
generating a final alphanumeric string based on the one or more alphanumeric strings using the computing apparatus, wherein generating a final alphanumeric string based on the one or more alphanumeric strings comprises:
providing one or more fill-in-the-blank phrases with the computing apparatus; and
inserting at least the first selected alphanumeric string and the second selected alphanumeric string into a fill-in-the-blank phrase of the one or more fill-in-the-blank phrases to provide the final alphanumeric string;
imaging the user space with the imaging apparatus to provide two or more images;
storing the two or more images with the computing apparatus; and
printing using the printing apparatus a photo strip, wherein the photo strip comprises:
at least two images of the two or more images; and
the final alphanumeric string.

15. The method of claim 14, wherein interacting between the photo booth and each user group of the one or more user groups further comprises:
displaying on the display a preview image of the user space to be imaged by the imaging apparatus;
displaying on the display a speech bubble overlaying the preview image; and
allowing the user group to move the speech bubble on the display using the input apparatus, wherein each image of the at least two images of the photo strip comprises the speech bubble, and wherein the speech bubble comprises at least a portion of the final alphanumeric string.

16. The method of claim 14, wherein interacting between the photo booth and each user group of the one or more user groups further comprises:
- displaying on the display a preview image of the user space to be imaged by the imaging apparatus; and
- displaying on the display the final alphanumeric string.

17. The method of claim 16, wherein displaying on the display the final alphanumeric string further comprises displaying on the display the final alphanumeric string within a speech bubble overlaying the preview image.

18. The method of claim 17, wherein interacting between the photo booth and each user group of the one or more user groups further comprises allowing the user group to move the final alphanumeric string within a speech bubble overlaying the preview image on the display using the input interface.

19. The method of claim 14, wherein generating the final alphanumeric string based on the one or more alphanumeric strings using the computing apparatus further comprises allowing the user group to select the fill-in-the-blank phrase to be used when generating the final alphanumeric string, wherein allowing the user group to select the fill-in-the-blank phrase comprises:
- displaying on the display the one or more fill-in-the-blank phrases; and
- allowing the user group to select the fill-in-the-blank phrase from the one or more fill-in-the-blank phrases.

20. The method of claim 14, wherein the method further comprises configuring the photo booth, wherein configuring the photo booth comprises allowing an administrator to input the one or more fill-in-the-blank phrases, the plurality of first alphanumeric strings, and the plurality of second alphanumeric strings.

21. The method of claim 14, wherein allowing the user group to input one or more alphanumeric strings using the input apparatus into the computing apparatus further comprises displaying on the display the fill-in-the-blank phrase of the one or more fill-in-the-blank phrases to be used when generating the final alphanumeric string.

22. The method of claim 14, wherein the input apparatus comprises a touch screen, and further wherein the display also comprises the touch screen.

23. The method of claim 22, wherein allowing the user group to input one or more alphanumeric strings using the input apparatus into the computing apparatus comprises:
- displaying on the touch screen a keyboard provided by the computing apparatus; and
- allowing the user group to use the keyboard displayed on the touch screen to input the one or more alphanumeric strings.

* * * * *

UNITED STATES PATENT AND TRADEMARK OFFICE
CERTIFICATE OF CORRECTION

PATENT NO. : 7,885,522 B2  
APPLICATION NO. : 12/172795  
DATED : February 8, 2011  
INVENTOR(S) : Gassman et al.

Page 1 of 1

It is certified that error appears in the above-identified patent and that said Letters Patent is hereby corrected as shown below:

In Column 13, line 35, the portion reading ""5...4...3...2...."" should read --"5...4...3...2...1."--

In Column 18, lines 38-39, the portion reading "(e.g., "_____ate_____ate at _____the while he was_____")" should read --(e.g., "_____ate_____at the _____while he was_____")--

Signed and Sealed this  
Twelfth Day of July, 2011

David J. Kappos  
*Director of the United States Patent and Trademark Office*